United States Patent
Sasaki et al.

(10) Patent No.: US 9,761,253 B1
(45) Date of Patent: Sep. 12, 2017

(54) THERMALLY-ASSISTED MAGNETIC RECORDING HEAD INCLUDING A MAIN POLE AND A PLASMON GENERATOR

(71) Applicants: Yoshitaka Sasaki, Los Gatos, CA (US); Hiroyuki Ito, Milpitas, CA (US); Hideo Mamiya, Milpitas, CA (US); Shigeki Tanemura, Milpitas, CA (US); Seiichiro Tomita, Milpitas, CA (US); Hironori Araki, Milpitas, CA (US)

(72) Inventors: Yoshitaka Sasaki, Los Gatos, CA (US); Hiroyuki Ito, Milpitas, CA (US); Hideo Mamiya, Milpitas, CA (US); Shigeki Tanemura, Milpitas, CA (US); Seiichiro Tomita, Milpitas, CA (US); Hironori Araki, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 15/282,503

(22) Filed: Sep. 30, 2016

(51) Int. Cl.
*G11B 5/31* (2006.01)
*G11B 5/48* (2006.01)
*G11B 5/00* (2006.01)

(52) U.S. Cl.
CPC ............ *G11B 5/314* (2013.01); *G11B 5/3169* (2013.01); *G11B 5/4866* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 9,330,702 B2* | 5/2016 | Araki | G11B 5/6088 |
| 9,449,625 B1* | 9/2016 | Vossough | G11B 5/3133 |
| 9,542,960 B2* | 1/2017 | Sasaki | G11B 5/315 |
| 2011/0170381 A1 | 7/2011 | Matsumoto | |
| 2016/0343391 A1* | 11/2016 | Sasaki | G11B 5/315 |

* cited by examiner

*Primary Examiner* — Will J Klimowicz
(74) *Attorney, Agent, or Firm* — Oliff PLC

(57) ABSTRACT

A main pole has a front end face including a first to a third end face portion. A plasmon generator has a near-field-light-generating surface. A surrounding layer has a first surrounding layer end face and a second surrounding layer end face. A gap film has a first gap film end face and a second gap film end face located on opposite sides of the near-field-light-generating surface in the track width direction. The first and second end face portions are interposed between the first and second surrounding layer end faces. The second end face portion is greater in width than the first end face portion. The third end face portion is greater in width than the second end face portion.

13 Claims, 17 Drawing Sheets

THERMALLY-ASSISTED MAGNETIC RECORDING HEAD INCLUDING A MAIN POLE AND A PLASMON GENERATOR

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium-facing surface configured to face the recording medium. The medium-facing surface has an air inflow end (a leading end) and an air outflow end (a trailing end).

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To eliminate this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium-facing surface of the slider.

U.S. Patent Application Publication No. 2011/0170381 A1 discloses a thermally-assisted magnetic recording head including a main pole, a waveguide and a plasmon generator. The main pole has an end face located in the medium-facing surface, and produces a write magnetic field from this end face. The plasmon generator has an end face located in the medium-facing surface. The waveguide includes a core and a cladding. In this head, the surface of the core and the surface of the plasmon generator face each other with a gap interposed therebetween. This head is configured to excite surface plasmons on the plasmon generator by using evanescent light that is generated at the surface of the core from the light propagating through the core, and to generate near-field light from the excited surface plasmons at the end face of the plasmon generator.

To achieve higher recording density, it is necessary to make the track width smaller by reducing at least one of the width of the end face of the plasmon generator in the medium-facing surface and the width of the end face of the main pole in the medium-facing surface. As the track width is reduced, it becomes more important to bring the end face of the plasmon generator and the end face of the main pole into precise alignment with each other.

U.S. Patent Application Publication No. 2011/0170381 A1 discloses a technique to form a plasmon generator by etching a metal layer using either the main pole or a mask for use to etch the main pole. This technique enables precise alignment of the end face of the plasmon generator and the end face of the main pole with each other. When employing this technique, however, any attempts to reduce the track width would result in a reduction in the width of the end face of the main pole, and this would cause the main pole to become unable to pass much magnetic flux and thus unable to produce a write magnetic field of sufficient magnitude from its end face.

OBJECT AND SUMMARY OF THE INVENTION

It is an object of the present invention to provide a thermally-assisted magnetic recording head and its manufacturing method for achieving the following first to third goals. The first goal is to precisely align an end face of a plasmon generator and an end face of a main pole with each other in the medium-facing surface. The second goal is to provide a small track width. The third goal is to produce a write magnetic field of sufficient magnitude from the end face of the main pole.

A thermally-assisted magnetic recording head of the present invention includes: a medium-facing surface configured to face a recording medium; a main pole; a waveguide; a plasmon generator; a surrounding layer; and a gap film. The main pole produces a write magnetic field for use to write data on the recording medium. The waveguide includes a core and a cladding, the core allowing light to propagate therethrough, the cladding being provided around the core. The plasmon generator has a near-field-light-generating surface located in the medium-facing surface. The gap film separates the plasmon generator from the surrounding layer.

The plasmon generator is configured to excite thereon a surface plasmon resulting from the light propagating through the core, and to generate near-field light from the surface plasmon at the near-field-light-generating surface.

The main pole has a front end face located in the medium-facing surface. The front end face includes a first end face portion, a second end face portion, and a third end face portion. The near-field-light-generating surface, the first end face portion, the second end face portion and the third end face portion are arranged in this order along the direction of travel of the recording medium. The main pole includes a tip portion including the first end face portion, a middle portion including the second end face portion, and a wide portion including the third end face portion.

The first end face portion has an edge closest to the near-field-light-generating surface. The edge has a first end point and a second end point opposite to each other in the track width direction. The second end face portion has a first side end and a second side end opposite to each other in the track width direction. Both the first side end and the second side end extend along the direction of travel of the recording medium. The distance between the first side end and the second side end is greater than the length of the edge of the first end face portion. The distance between the first side end and a first imaginary straight line is equal to the distance between the second side end and a second imaginary straight line, the first imaginary straight line passing through the first end point and being parallel to the direction of travel of the recording medium, the second imaginary straight line passing through the second end point and being parallel to the direction of travel of the recording medium. The maximum width of the third end face portion in the track width direction is greater than the distance between the first side end and the second side end.

The surrounding layer has a first surrounding layer end face and a second surrounding layer end face, both located in the medium-facing surface. The first surrounding layer end face and the second surrounding layer end face are located on opposite sides of the first and second end face portions in the track width direction so that the first and second end face portions are interposed between the first and second surrounding layer end faces. The gap film has a first gap film end face and a second gap film end face, both located in the medium-facing surface. The first gap film end face and the second gap film end face are located on opposite sides of at least part of the near-field-light-generating surface in the track width direction so that the at least part of the near-field-light-generating surface is interposed between the first and second gap film end faces.

In the thermally-assisted magnetic recording head of the present invention, the first gap film end face may include a portion interposed between the first surrounding layer end face and the first end face portion and include no portion interposed between the first surrounding layer end face and the second end face portion. The second gap film end face may include a portion interposed between the second surrounding layer end face and the first end face portion and include no portion interposed between the second surrounding layer end face and the second end face portion.

In the thermally-assisted magnetic recording head of the present invention, the front end face of the main pole may further include a fourth end face portion. In this case, the third end face portion is interposed between the second end face portion and the fourth end face portion. The fourth end face portion is greater than the third end face portion in width in the track width direction. At least part of the third end face portion is interposed between the first and second surrounding layer end faces. The fourth end face portion includes no portion interposed between the first and second surrounding layer end faces.

The thermally-assisted magnetic recording head of the present invention may further include a separating film for separating the main pole from the surrounding layer. The separating film is a single continuous film, and at least part of the separating film is interposed between the main pole and the plasmon generator, between the main pole and the surrounding layer, and between the main pole and the gap film.

In the thermally-assisted magnetic recording head of the present invention, the surrounding layer may be formed of a nonmagnetic metal material.

In the thermally-assisted magnetic recording head of the present invention, the surrounding layer may include a first side shield and a second side shield each formed of a magnetic material. The first side shield has a first side shield end face constituting at least part of the first surrounding layer end face. The second side shield has a second side shield end face constituting at least part of the second surrounding layer end face.

In the thermally-assisted magnetic recording head of the present invention, the core may have an evanescent light generating surface configured to generate evanescent light from the light propagating through the core, and the plasmon generator may include a plasmon-exciting section located at a predetermined distance from the evanescent-light-generating surface and facing the evanescent-light-generating surface. In this case, the plasmon generator is configured so that a surface plasmon is excited on the plasmon-exciting section through coupling with the evanescent light generated by the evanescent-light-generating surface, the surface plasmon propagates to the near-field-light-generating surface, and the near-field-light-generating surface generates near-field light from the surface plasmon.

In the thermally-assisted magnetic recording head of the present invention, the front end face of the main pole may be located on the front side in the direction of travel of the recording medium relative to the near-field-light-generating surface.

A manufacturing method for the thermally-assisted magnetic recording head of the present invention includes the steps of: forming the waveguide; forming the plasmon generator; forming the surrounding layer and the gap film after the plasmon generator is formed; and forming the main pole after the surrounding layer and the gap film are formed.

The step of forming the plasmon generator includes the steps of: forming an initial plasmon generator; forming an etching mask for use to pattern the initial plasmon generator; and etching the initial plasmon generator by using the etching mask so that the initial plasmon generator becomes the plasmon generator.

The step of forming the surrounding layer and the gap film includes: the step of forming an initial gap film to cover the plasmon generator and the etching mask after the step of etching the initial plasmon generator; the step of forming the surrounding layer after the initial gap film is formed; and the removal step of removing a portion of the initial gap film and at least a portion of the etching mask after the surrounding layer is formed. The removal step makes the initial gap film into the gap film and results in the formation of a structure having a recess, the structure including the plasmon generator, the surrounding layer and the gap film. The recess includes a first space for receiving at least part of the tip portion and a second space for receiving at least part of the middle portion. The main pole is formed such that the at least part of the tip portion is received in the first space and the at least part of the middle portion is received in the second space.

The thermally-assisted magnetic recording head manufactured by the manufacturing method of the present invention may further include a separating film for separating the main pole from the surrounding layer. The separating film is a single continuous film, and at least part of the separating film is interposed between the main pole and the plasmon generator, between the main pole and the surrounding layer, and between the main pole and the gap film.

Where the thermally-assisted magnetic recording head includes the separating film, the manufacturing method of the present invention may further include the step of forming the separating film on the structure after the removal step such that the separating film forms a receiving section corresponding to the recess. In this case, after the step of forming the separating film, the main pole is formed on the separating film such that the entirety of the tip portion and at least part of the middle portion are received in the receiving section.

In the manufacturing method of the present invention, the removal step may employ wet etching to remove the portion of the initial gap film.

In the manufacturing method of the present invention, the step of forming the surrounding layer may include the steps of: forming an initial surrounding layer to cover the initial gap film; and polishing the initial surrounding layer until the etching mask is exposed. In this case, the step of forming the surrounding layer may further include the step of etching a portion of the initial surrounding layer after the step of polishing the initial surrounding layer.

In the present invention, the first and second end face portions of the front end face of the main pole are interposed between the first and second surrounding layer end faces. The distance between the first side end and the second side end of the second end face portion is greater than the length of the edge of the first end face portion. By virtue of this configuration, the present invention enables precise alignment of the end face of the plasmon generator and the end face of the main pole with each other in the medium-facing surface, enables a reduction in track width, and enables production of a write magnetic field of sufficient magnitude from the end face of the main pole.

Other and further objects, features and advantages of the present invention will appear more fully from the following description.

DETAILED DESCRIPTION OF THE PREFERRED EMBODIMENTS

First Embodiment

Figure 1:
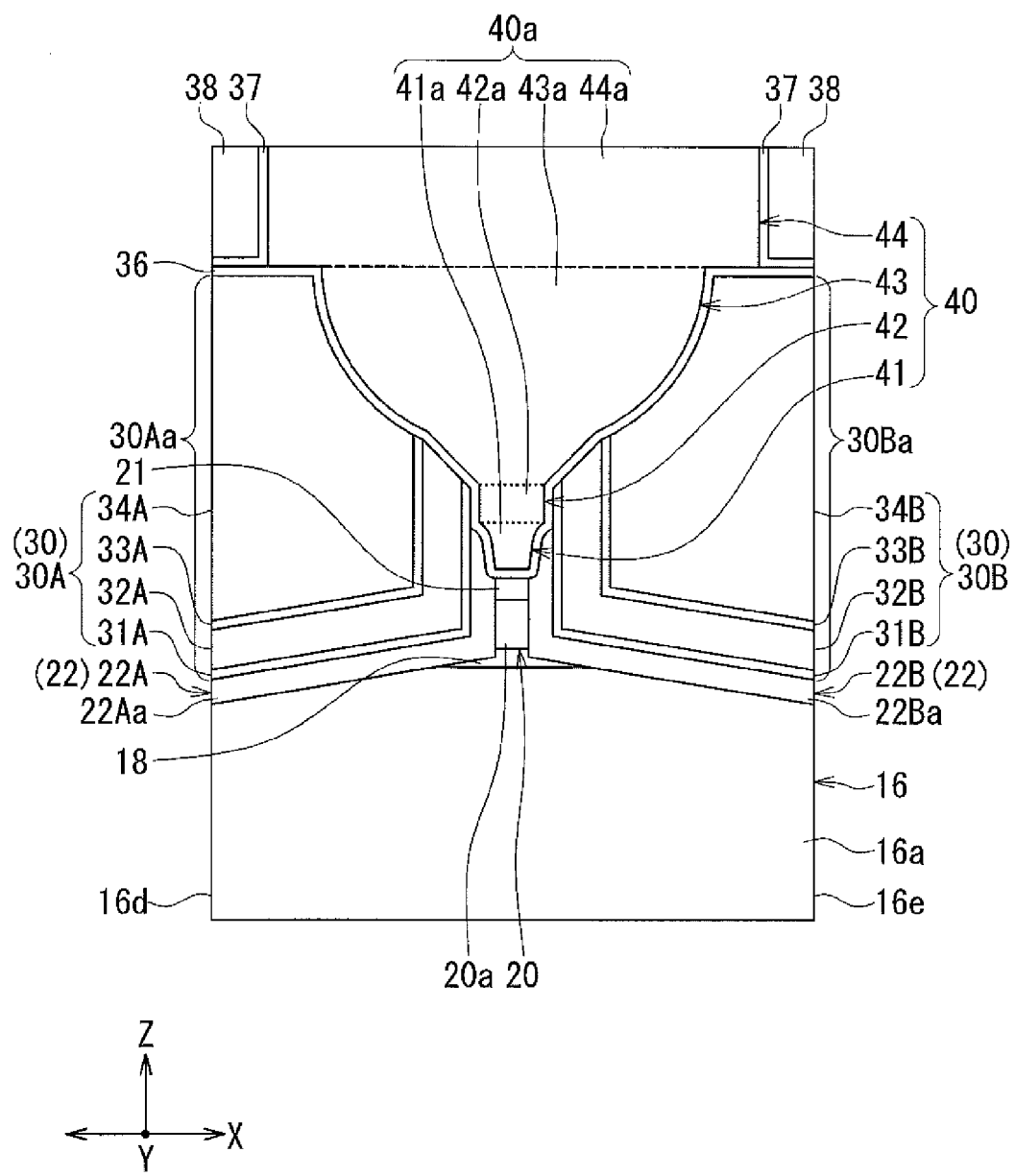
FIG. 1 is a front view showing the main part of a thermally-assisted magnetic recording head according to a first embodiment of the invention.
Figure 2:
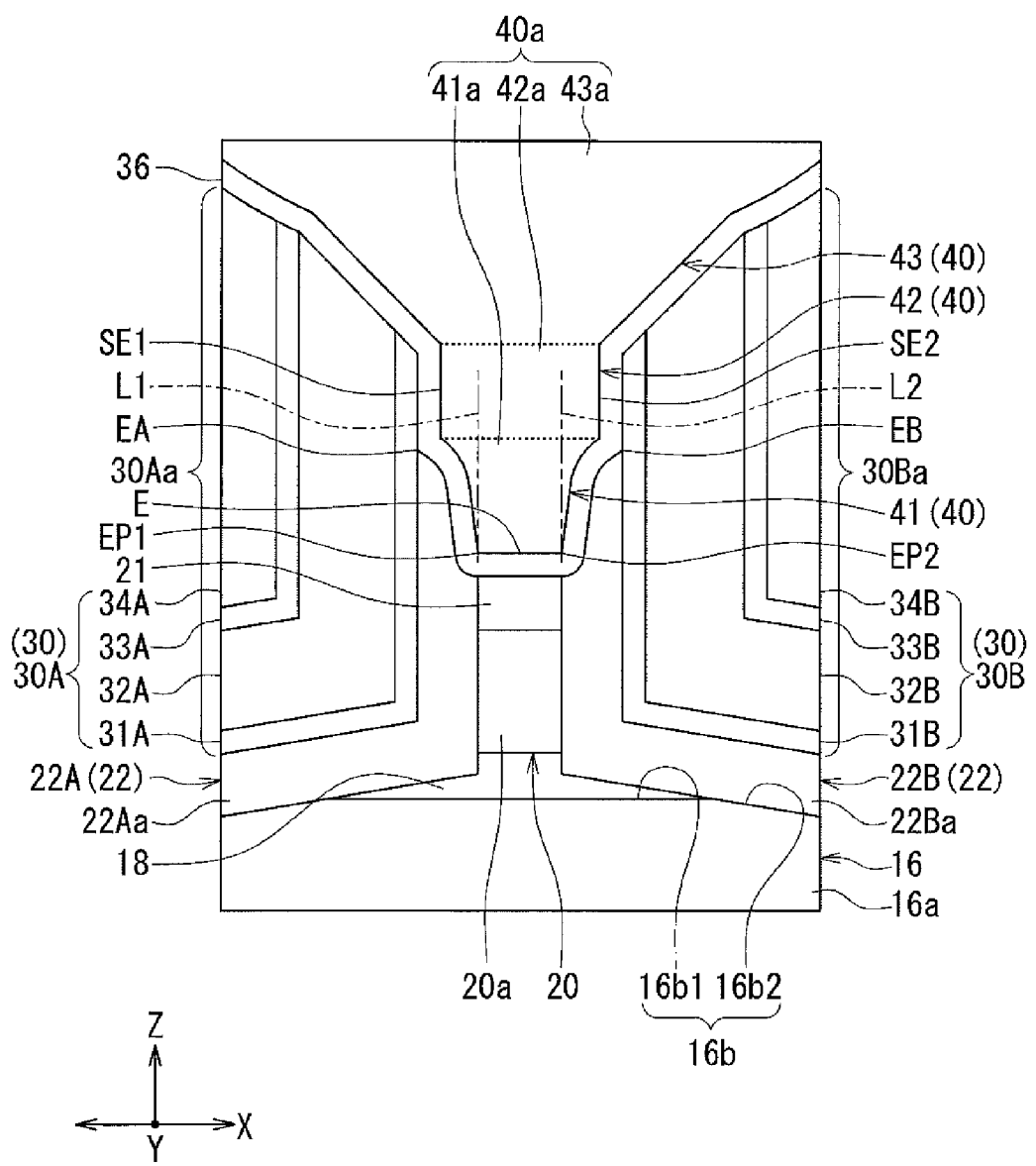
FIG. 2 is an enlarged front view of a portion of FIG. 1.
Figure 3:
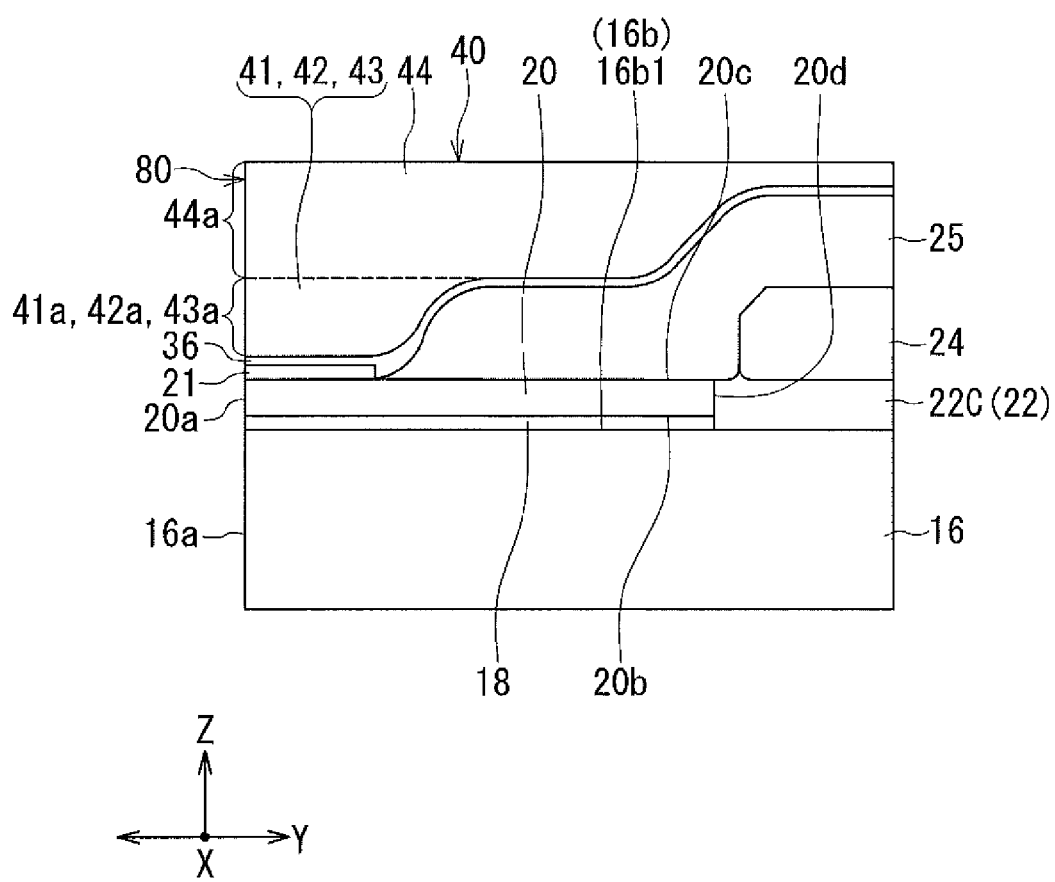
FIG. 3 is a cross-sectional view showing the main part of the thermally-assisted magnetic recording head according to the first embodiment of the invention.
Figure 4:
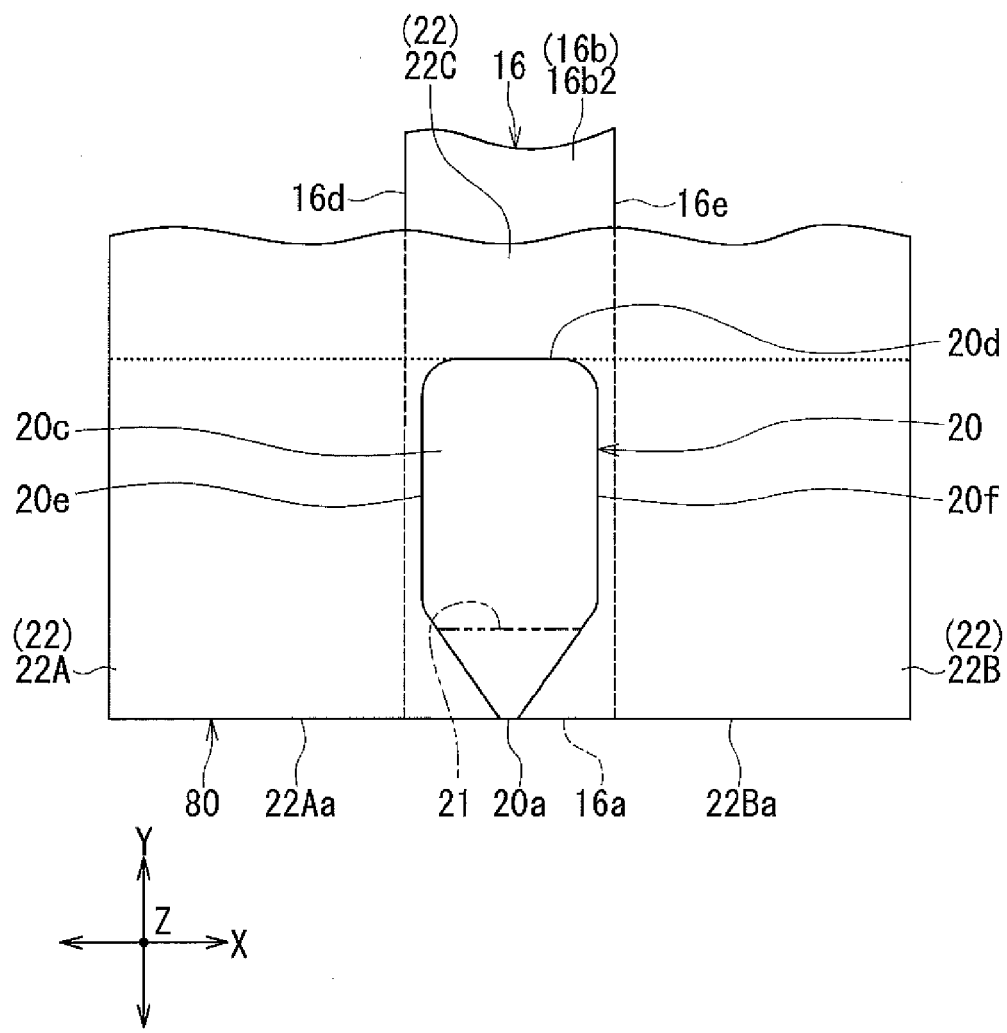
FIG. 4 is a plan view showing a core, a plasmon generator, and a gap film of the first embodiment of the invention.
Figure 5:
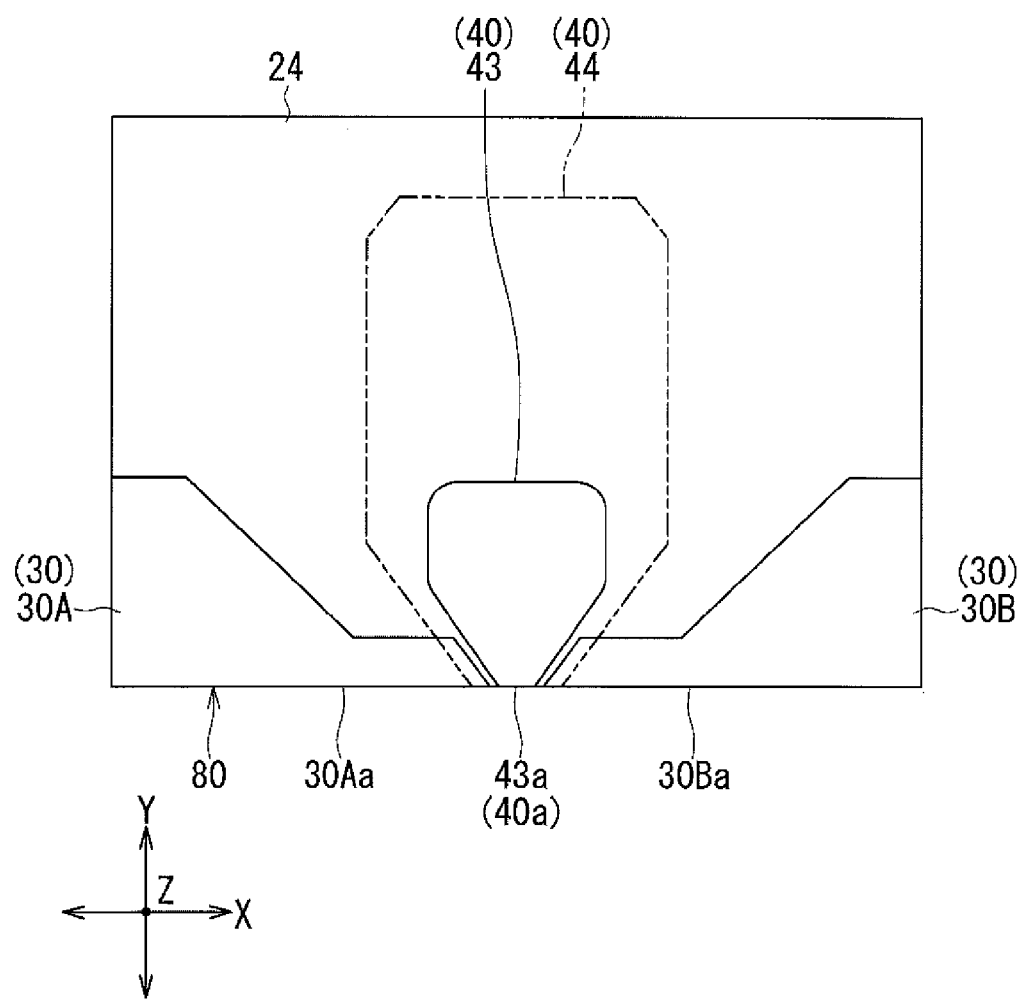
FIG. 5 is a plan view showing a main pole, a surrounding layer, and a first heat sink of the first embodiment of the invention.
Figure 6:
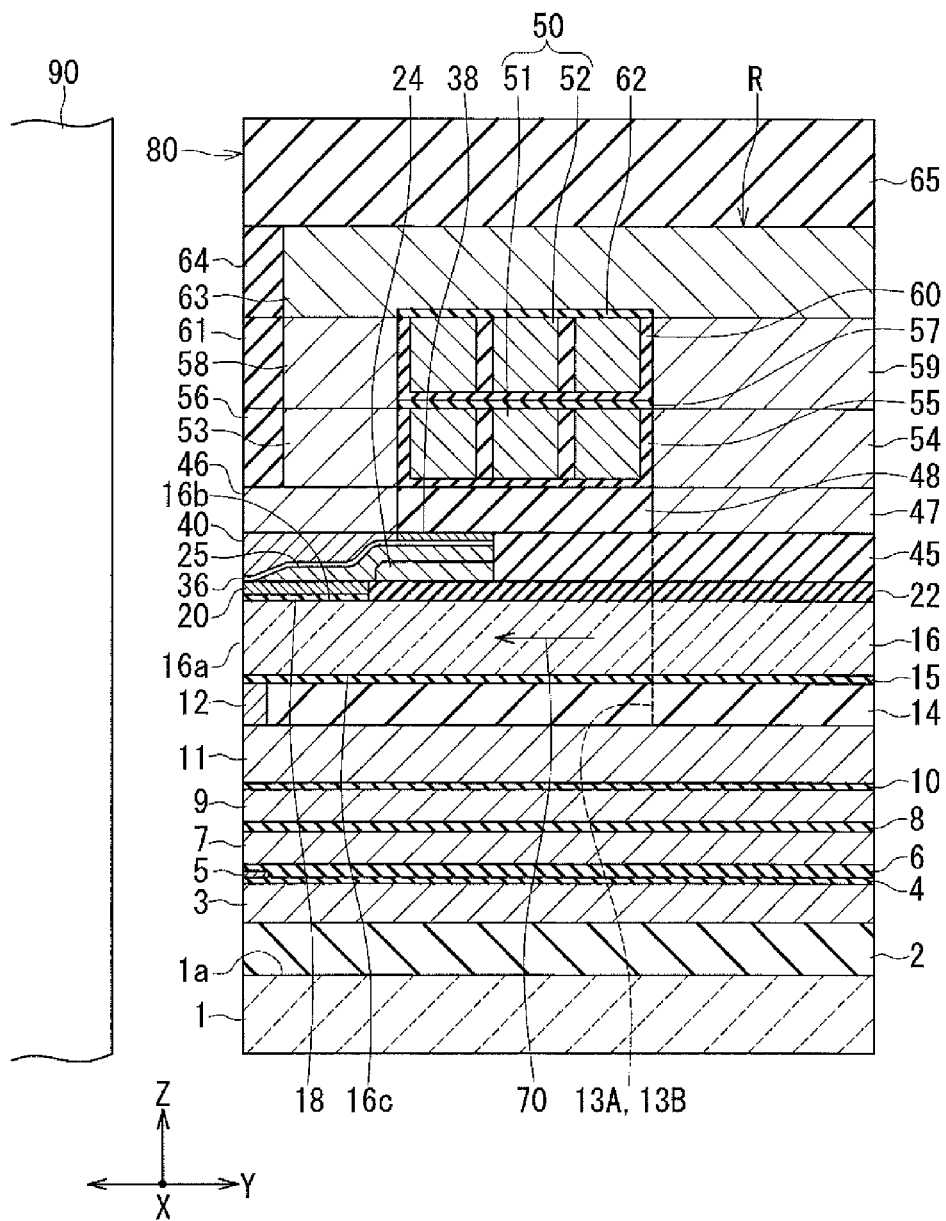
FIG. 6 is a cross-sectional view showing the configuration of the thermally-assisted magnetic recording head according to the first embodiment of the invention.
Figure 7:
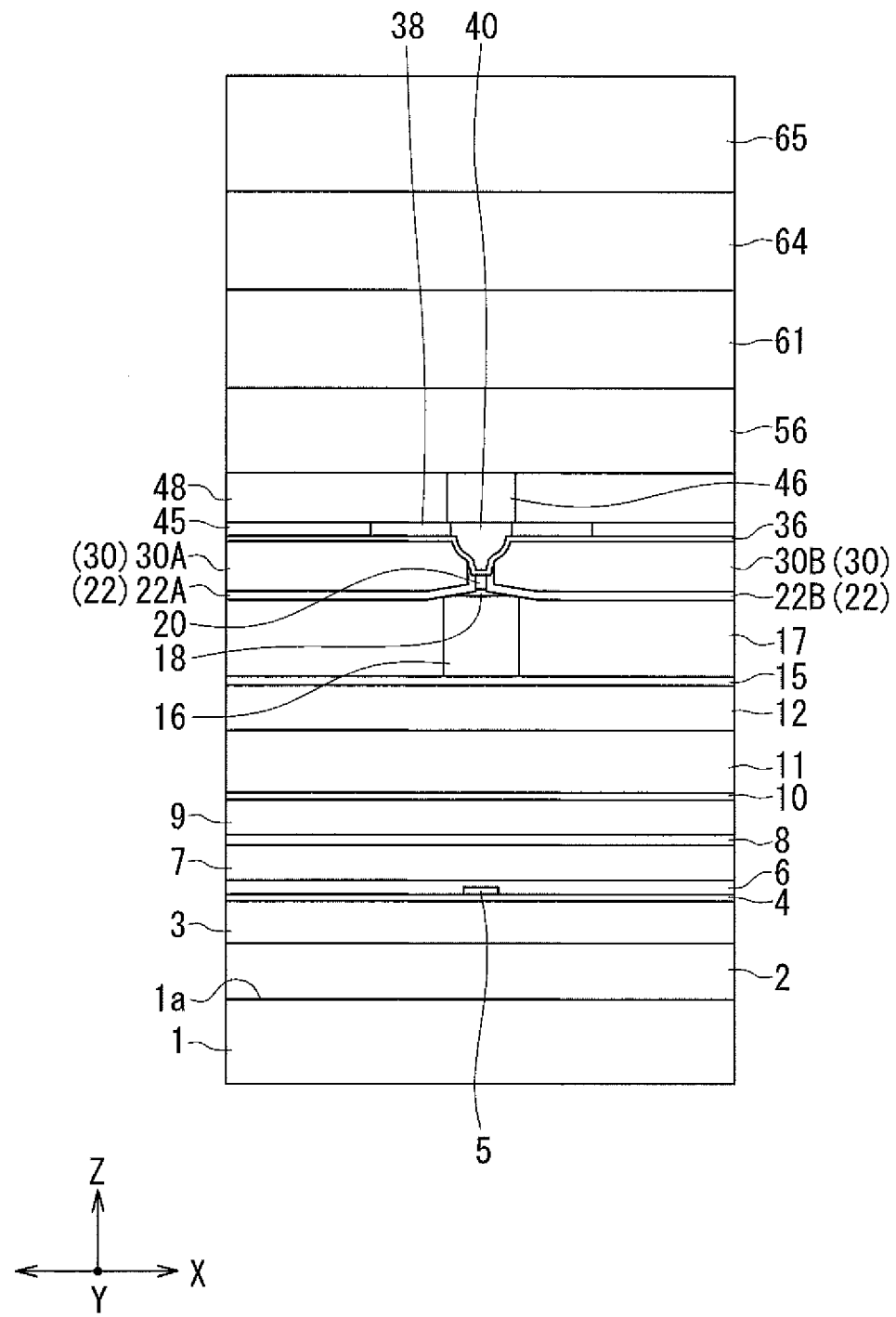
FIG. 7 is a front view showing the medium-facing surface of the thermally-assisted magnetic recording head according to the first embodiment of the invention.

Preferred embodiments of the present invention will now be described in detail with reference to the drawings. First, reference is made to FIG. 1 to FIG. 7 to describe the configuration of a thermally-assisted magnetic recording head according to a first embodiment of the invention. FIG. 1 is a front view showing the main part of the thermally-assisted magnetic recording head. FIG. 2 is an enlarged front view of a portion of FIG. 1. FIG. 3 is a cross-sectional view showing the main part of the thermally-assisted magnetic recording head. FIG. 4 is a plan view showing a core, a plasmon generator, and a gap film. FIG. 5 is a plan view showing a main pole, a surrounding layer, and a first heat sink. FIG. 6 is a cross-sectional view showing the configuration of the thermally-assisted magnetic recording head. FIG. 7 is a front view showing the medium-facing surface of the thermally-assisted magnetic recording head.

The thermally-assisted magnetic recording head according to the present embodiment is intended for use in perpendicular magnetic recording, and is incorporated in a slider configured to fly over the surface of a rotating recording medium 90. The slider has a medium-facing surface 80 configured to face the recording medium 90. When the recording medium 90 rotates, an airflow passing between the recording medium 90 and the slider causes a lift to be exerted on the slider. The lift causes the slider to fly over the surface of the recording medium 90.

As shown in FIG. 6, the thermally-assisted magnetic recording head has the medium-facing surface 80. Here, we define X direction, Y direction, and Z direction as follows. The X direction is the direction across the tracks of the recording medium 90, i.e., the track width direction. The Y direction is a direction perpendicular to the medium-facing surface 80. The Z direction is the direction of travel of the recording medium 90 as viewed from the slider. The X, Y, and Z directions are orthogonal to one another.

As shown in FIG. 6 and FIG. 7, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium-facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 50 and a main pole 40. The coil 50 produces a magnetic field corresponding to data to be written on the recording medium 90. As shown in FIG. 1 to FIG. 3 and FIG. 5, the main pole 40 has a front end face 40a located in the medium-facing surface 80. The main pole 40 passes a magnetic flux corresponding to the magnetic field produced by the coil 50, and produces a write magnetic field for use to write data on the recording medium 90 by means of the perpendicular magnetic recording system. The coil 50 is formed of a conductive material such as copper.

The write head unit further includes a shield 12 formed of a magnetic material, and a return path section R formed of a magnetic material. The shield 12 has an end face located in the medium-facing surface 80. The return path section R connects the main pole 40 and the shield 12 to each other, and passes a magnetic flux corresponding to the magnetic field produced by the coil 50.

The return path section R includes a return pole layer 11, two coupling sections 13A and 13B, coupling layers 46, 47, 53, 54, 58 and 59, and a yoke layer 63. The return pole layer 11 lies on the nonmagnetic layer 10. The return pole layer 11 has an end face located in the medium-facing surface 80. The write head unit further includes a non-illustrated insulating layer provided around the return pole layer 11. The non-illustrated insulating layer is formed of alumina, for example.

The shield 12 is located on a first portion of the top surface of the return pole layer 11, the first portion being near the medium-facing surface 80. The two coupling sections 13A and 13B are located on two second portions of the top surface of the return pole layer 11, the two second portions being located away from the medium-facing surface 80. Each of the coupling sections 13A and 13B includes a first layer lying on the return pole layer 11, and a second and a third layer stacked in this order on the first layer. The first layer of the coupling section 13A and the first layer of the coupling section 13B are arranged to be adjacent in the track width direction (the X direction).

The write head unit further includes an insulating layer 14 lying on the non-illustrated insulating layer and a portion of the top surface of the return pole layer 11 other than the first and second portions. The first layers of the coupling sections 13A and 13B are embedded in the insulating layer 14. The insulating layer 14 is formed of alumina, for example.

The write head unit further includes a waveguide including a core 16 and a cladding, the core 16 allowing light to propagate therethrough, the cladding being provided around the core 16. As shown in FIGS. 1 to 4 and 6 in particular, the core 16 has a front end face 16a facing toward the medium-facing surface 80, a top surface 16b, a bottom surface 16c, and two side surfaces 16d and 16e. The front end face 16a may be located in the medium-facing surface 80 or at a distance from the medium-facing surface 80. FIGS. 1 to 4, 6 and 7 show an example in which the front end face 16a is located in the medium-facing surface 80. The top surface 16b includes an evanescent-light-generating surface 16b1, and a surrounding portion 16b2 located around the evanescent-light-generating surface 16b1. The surrounding portion 16b2 includes two portions located on opposite sides of the evanescent-light-generating surface 16b1 in the track width direction (the X direction). The distance from the bottom surface 16c to each of the aforementioned two portions of the surrounding portion 16b2 decreases with increasing distance from the evanescent-light-generating surface 16b1.

The cladding includes cladding layers 15, 17 and 18. The cladding layer 15 lies on the shield 12 and the insulating layer 14. The core 16 lies on the cladding layer 15. The cladding layer 17 lies on the cladding layer 15 and surrounds the core 16. The cladding layer 18 lies on the evanescent-light-generating surface 16b1 of the core 16.

The core 16 is formed of a dielectric material that transmits laser light to be used for generating near-field light. The laser light emitted from a non-illustrated laser diode enters the core 16 and propagates through the core 16. The cladding layers 15, 17 and 18 are each formed of a dielectric material that has a refractive index lower than that of the core 16. For example, the core 16 may be formed of tantalum oxide such as $Ta_2O_5$ or silicon oxynitride (SiON), whereas the cladding layers 15, 17 and 18 may be formed of silicon oxide ($SiO_2$) or alumina.

The second layers of the coupling sections 13A and 13B are embedded in the cladding layers 15 and 17. The second layer of the coupling section 13A and the second layer of the coupling section 13B are located on opposite sides of the core 16 in the track width direction (the X direction) and spaced from the core 16.

The write head unit further includes a plasmon generator 20 lying on the cladding layer 18 in the vicinity of the medium-facing surface 80, and an insulating film 21 lying on a portion of the plasmon generator 20 in the vicinity of the medium-facing surface 80. FIGS. 6 and 7 omit the illustration of the insulating film 21. The plasmon generator 20 is configured to excite surface plasmons thereon on the principle to be described later. The plasmon generator 20 is formed of, for example, one of Au, Ag, Al, Cu, Pd, Pt, Rh and Ir, or an alloy composed of two or more of these elements. The insulating film 21 is formed of silicon oxide, for example. The shape of the plasmon generator 20 will be described in detail later.

The write head unit further includes a gap film 22 formed of an insulating material. The gap film 22 lies on the core 16 and the cladding layer 17 and surrounds the cladding layer 18, the plasmon generator 20 and the insulating film 21. As shown in FIG. 1 to FIG. 4, the gap film 22 includes a first portion 22A, a second portion 22B and a third portion 22C. The first portion 22A and the second portion 22B are located on opposite sides of the plasmon generator 20 in the track width direction (the X direction). The third portion 22C is located farther from the medium-facing surface 80 than is the plasmon generator 20, and lies on the surrounding portion 16b2 of the top surface 16b of the core 16 and the top surface of the cladding layer 17. In FIG. 4, the boundary between the third portion 22C and each of the first and second portions 22A and 22B is shown by a dotted line. The gap film 22 is formed of alumina, for example.

The write head unit further includes a surrounding layer 30 lying on a portion of the gap film 22 in the vicinity of the medium-facing surface 80. As shown in FIGS. 1 and 2, the gap film 22 separates the plasmon generator 20 from the surrounding layer 30. Further, as shown in FIGS. 1, 2, 5 and 7, the surrounding layer 30 includes a first side portion 30A and a second side portion 30B. The first side portion 30A lies on the first portion 22A of the gap film 22. The second side portion 30B lies on the second portion 22B of the gap film 22.

As shown in FIGS. 1 and 2, the first side portion 30A of the surrounding layer 30 includes a first layer 31A, a second layer 32A, a third layer 33A and a fourth layer 34A. The first layer 31A is formed of a nonmagnetic material. The second, third and fourth layers 32A, 33A and 34A are each formed of a nonmagnetic metal material. The first, second, third and fourth layers 31A, 32A, 33A and 34A are stacked on the first portion 22A of the gap film 22. The fourth layer 34A constitutes the principal part of the first side portion 30A.

As shown in FIGS. 1 and 2, the second side portion 30B of the surrounding layer 30 includes a first layer 31B, a second layer 32B, a third layer 33B and a fourth layer 34B. The first layer 31B is formed of a nonmagnetic material. The second, third and fourth layers 32B, 33B and 34B are each formed of a nonmagnetic metal material. The first, second, third and fourth layers 31B, 32B, 33B and 34B are stacked on the second portion 22B of the gap film 22. The fourth layer 34B constitutes the principal part of the second side portion 30B.

The nonmagnetic material used to form the first layers 31A and 31B may be an insulating material or a nonmagnetic metal material. In the latter case, the entirety of the surrounding layer 30 is formed of a nonmagnetic metal material. An example of an insulating material that can be used to form the first layers 31A and 31B is alumina or silicon oxide. An example of a nonmagnetic metal material that can be used to form the first layers 31A and 31B is Ru or Rh.

The nonmagnetic metal material used to form the second layers 32A and 32B may be Au or Cu, for example. The nonmagnetic metal material used to form the third layers 33A and 33B may be Ru or Rh, for example. The nonmagnetic metal material used to form the fourth layers 34A and 34B may be Ni, Cr, Ta, Ru, Rh or Rd, for example. Even when the third layers 33A, 33B and the fourth layers 34A, 34B are formed of the same material, the third layers 33A, 33B and the fourth layers 34A, 34B have different properties because they are formed by different methods.

The write head unit further includes a first heat sink 24 located away from the medium-facing surface 80 and lying on the third portion 22C of the gap film 22, and a second heat sink 25 located away from the medium-facing surface 80 and lying on the plasmon generator 20 and the first heat sink 24. The first and second heat sinks 24 and 25 are formed of Au or Cu, for example.

The main pole 40 is located on the front side in the direction of travel of the recording medium 90 relative to the core 16. The plasmon generator 20 is located between the core 16 and the main pole 40. The write head unit further includes a separating film 36 formed of a nonmagnetic material and lying on the insulating film 21, the gap film 22, the surrounding layer 30 and the second heat sink 25. The main pole 40 lies on the separating film 36. As shown in FIGS. 1, 2 and 7, the separating film 36 separates the main pole 40 from the surrounding layer 30. As shown in FIGS. 1-3, 6 and 7, the separating film 36 is a single continuous film, and at least part of the separating film 36 is interposed between the main pole 40 and the plasmon generator 20, between the main pole 40 and the surrounding layer 30, and between the main pole 40 and the gap film 22. As shown in FIG. 1 to FIG. 3, the insulating film 21 is interposed between the separating film 36 and the plasmon generator 20 in the vicinity of the medium-facing surface 80. As shown in FIG. 3, the separating film 36 also includes a portion interposed between the main pole 40 and the second heat sink 25.

The nonmagnetic material used to form the separating film 36 may be an insulating material or a nonmagnetic metal material. An example of an insulating material that can be used to form the separating film 36 is alumina or silicon oxide. An example of a nonmagnetic metal material that can be used to form the separating film 36 is Ru or Rh. In the present embodiment, the separating film 36 is formed of a nonmagnetic metal material, in particular.

As shown in FIGS. 1 and 2, the main pole 40 includes a tip portion 41, a middle portion 42 and a wide portion 43. The tip portion 41, the middle portion 42 and the wide portion 43 are arranged in this order along the direction of travel of the recording medium 90. In FIGS. 1 and 2, the boundary between the tip portion 41 and the middle portion 42 and the boundary between the middle portion 42 and the wide portion 43 are shown by respective dotted lines. The tip portion 41, the middle portion 42 and the wide portion 43 are located between the first side portion 30A and the second side portion 30B of the surrounding layer 30.

As shown in FIGS. 1, 3 and 5, the main pole 40 further includes an extended portion 44 located on the front side in the direction of travel of the recording medium 90 (the Z direction) relative to the wide portion 43. In FIGS. 1 and 3 the boundary between the wide portion 43 and the extended portion 44 is shown by a broken line. Part of the extended portion 44 lies over the surrounding layer 30 with the separating film 36 interposed therebetween.

The write head unit further includes a third heat sink 38 and a nonmagnetic metal film 37. The third heat sink 38 is disposed to extend along the top surfaces of the surrounding layer 30 and the second heat sink 25 and the side surfaces of the extended portion 44 of the main pole 40. As shown in FIG. 1, the nonmagnetic metal film 37 is interposed between the third heat sink 38 and the extended portion 44, and between the third heat sink 38 and the surrounding layer 30. FIG. 6 and FIG. 7 omit the illustration of the nonmagnetic metal film 37. Although not illustrated, the nonmagnetic metal film 37 is interposed also between the third heat sink 38 and the second heat sink 25. As shown in FIG. 1, the separating film 36 is interposed between the nonmagnetic metal film 37 and the surrounding layer 30. Although not illustrated, the separating film 36 is interposed also between the nonmagnetic metal film 37 and the second heat sink 25.

The third heat sink 38 is formed of the same material as the first and second heat sinks 24 and 25, for example. The first, second and third heat sinks 24, 25 and 38 and the surrounding layer 30 have the function of dissipating heat generated by the plasmon generator 20 outward from the plasmon generator 20 and the main pole 40. The separating film 36 includes a portion interposed between the main pole 40 and the plasmon generator 20. The separating film 36 is in contact with the second heat sink 25 and the surrounding layer 30 and connected to the third heat sink 38 via the nonmagnetic metal film 37. Thus, where the separating film 36 is formed of a high thermal conductivity material such as nonmagnetic metal, the heat generated by the plasmon generator 20 can be transferred to the second and third heat sinks 25 and 38 and the surrounding layer 30 by the separating film 36. This allows the above-described effect of the first, second and third heat sinks 24, 25 and 38 and the surrounding layer 30 to be markedly exerted.

The nonmagnetic metal film 37 has the function of preventing the material of the third heat sink 38 from diffusing into the main pole 40. The nonmagnetic metal film 37 is formed of Ru, Cr, Zr, Ti or Ta, for example. Even when the nonmagnetic metal film 37 and the fourth layers 34A and 34B of the surrounding layer 30 are formed of the same material, the nonmagnetic metal film 37 and the fourth layers 34A and 34B of the surrounding layer 30 have different properties because they are formed by different methods.

The write head unit further includes a dielectric layer 45 provided around the surrounding layer 30 and the first, second and third heat sinks 24, 25 and 38. The dielectric layer 45 is formed of the same material as the cladding layers 15, 17 and 18, for example.

The third layers of the coupling sections 13A and 13B are embedded in the gap film 22 and the dielectric layer 45. The coupling layer 47 lies on the third layers of the coupling sections 13A and 13B and the dielectric layer 45.

The coupling layer 46 lies on the main pole 40, the third heat sink 38 and the dielectric layer 45. The coupling layer 46 has an end face located in the medium-facing surface 80. The write head unit further includes a non-illustrated nonmagnetic metal film interposed between the third heat sink 38 and the coupling layer 46, and a dielectric layer 48 disposed around the coupling layer 46 and the coupling layer 47. The non-illustrated nonmagnetic metal film has the function of preventing the material of the third heat sink 38 from diffusing into the coupling layer 46. The non-illustrated nonmagnetic metal film is formed of the same material as the nonmagnetic metal film 37, for example. The dielectric layer 48 is formed of the same material as the cladding layers 15, 17 and 18, for example.

The coupling layer 53 lies on the coupling layer 46. The coupling layer 53 has an end face facing toward the medium-facing surface 80 and located at a distance from the medium-facing surface 80. The coupling layer 54 lies on the coupling layer 47.

The coil 50 includes a first layer 51 and a second layer 52. The first layer 51 and the second layer 52 are connected in series, for example. The first layer 51 is wound around the coupling layer 54. The write head unit further includes an insulating film 55, an insulating layer 56 and an insulating layer 57. The insulating film 55 is interposed between the first layer 51 and each of the coupling layers 53 and 54 and the dielectric layer 48. The insulating layer 56 is disposed around the first layer 51 and the coupling layer 53 and in the space between adjacent turns of the first layer 51. The insulating layer 57 lies on the first layer 51, the insulating film 55 and the insulating layer 56. The insulating film 55 and the insulating layers 56 and 57 are formed of alumina, for example.

The coupling layer 58 lies on the coupling layer 53. The coupling layer 58 has an end face facing toward the medium-facing surface 80 and located at a distance from the medium-facing surface 80. The coupling layer 59 lies on the coupling layer 54.

The second layer 52 of the coil 50 lies above the first layer 51. The second layer 52 is wound around the coupling layer 59. The write head unit further includes an insulating film 60, an insulating layer 61 and an insulating layer 62. The insulating film 60 is interposed between the second layer 52 and each of the coupling layers 58 and 59 and the insulating layer 57. The insulating layer 61 is disposed around the second layer 52 and the coupling layer 58 and in the space between adjacent turns of the second layer 52. The insulating layer 62 lies on the second layer 52, the insulating film 60 and the insulating layer 61. The insulating film 60 and the insulating layers 61 and 62 are formed of alumina, for example.

The yoke layer 63 lies on the coupling layers 58 and 59 and the insulating layer 62. The yoke layer 63 has an end face facing toward the medium-facing surface 80 and located at a distance from the medium-facing surface 80. The write head unit further includes an insulating layer 64 disposed around the yoke layer 63. The insulating layer 64 is formed of alumina, for example.

As shown in FIG. 6 and FIG. 7, the thermally-assisted magnetic recording head further includes a protective layer 65 disposed to cover the write head unit. The protective layer 65 is formed of alumina, for example.

As has been described, the thermally-assisted magnetic recording head according to the present embodiment includes the medium-facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coil 50, the main pole 40, the waveguide, the plasmon generator 20, the surrounding layer 30, the gap film 22, and the separating film 36. The waveguide includes the core 16 and the cladding. The cladding includes the cladding layers 15, 17 and 18.

The write head unit further includes the shield 12 and the return path section R. The shield 12 and the return path section R have the function of allowing a magnetic flux that has been produced from the front end face 40a of the main pole 40 and has magnetized a portion of the recording medium 90 to flow back to the main pole 40.

An example of the shape of the plasmon generator 20 will now be described with reference to FIG. 1 to FIG. 4. The plasmon generator 20 has a near-field-light-generating surface 20a located in the medium-facing surface 80, a plasmon-exciting section 20b serving as a bottom surface, a top surface 20c, a rear end face 20d located opposite to the near-field-light-generating surface 20a, and two side surfaces 20e and 20f. The plasmon-exciting section 20b is located at a predetermined distance from the evanescent-light-generating surface 16b1 in the top surface 16b of the core 16 and faces the evanescent-light-generating surface 16b1. The cladding layer 18 is interposed between the evanescent-light-generating surface 16b1 and the plasmon-exciting section 20b. For example, the plasmon generator 20 is generally rectangular in cross section parallel to the medium-facing surface 80. The near-field-light-generating surface 20a is located between the front end face 40a of the main pole 40 and the front end face 16a of the core 16. The near-field-light-generating surface 20a generates near-field light on the principle to be described later.

As shown in FIG. 4, the width of the plasmon generator 20 in the track width direction (the X direction) gradually increases with increasing distance from the medium-facing surface 80 and then becomes constant. The width (the dimension in the track width direction (the X direction)) of the near-field-light-generating surface 20a is defined by the width of the plasmon generator 20 in the medium-facing surface 80. The width of the near-field-light-generating surface 20a falls within the range of 5 to 40 nm, for example. The height (the dimension in the Z direction) of the near-field-light-generating surface 20a is defined by the height of the plasmon generator 20 in the medium-facing surface 80. The height of the near-field-light-generating surface 20a falls within the range of 5 to 40 nm, for example.

The main pole 40 will now be described in detail with reference to FIGS. 1 to 3 and 5. As shown in FIGS. 1 to 3, the front end face 40a of the main pole 40 and the near-field-light-generating surface 20a of the plasmon generator 20 are at locations different from each other in the direction of travel of the recording medium 90 (the Z direction). In the present embodiment, the front end face 40a is located on the trailing side, i.e., the front side in the direction of travel of the recording medium 90, relative to the near-field-light-generating surface 20a.

The front end face 40a of the main pole 40 includes a first end face portion 41a, a second end face portion 42a, and a third end face portion 43a. The near-field-light-generating surface 20a, the first end face portion 41a, the second end face portion 42a, and the third end face portion 43a are arranged in this order along the direction of travel of the recording medium 90. The front end face 40a of the main pole 40 further includes a fourth end face portion 44a. The fourth end face portion 44a is located on the front side in the direction of travel of the recording medium 90 relative to the third end face portion 43a. Thus, the third end face portion 43a is interposed between the second end face portion 42a and the fourth end face portion 44a.

As shown in FIG. 2, the first end face portion 41a has an edge E closest to the near-field-light-generating surface 20a. The edge E has a length equal or nearly equal to the width of the near-field-light-generating surface 20a in the track width direction (the X direction). As will be described later in relation to a modification example of the present embodiment, the length of the edge E may be either smaller or greater than the width of the near-field-light-generating surface 20a.

The width of the first end face portion 41a in the track width direction increases with increasing distance from the near-field-light-generating surface 20a. The width of the second end face portion 42a in the track width direction is constant regardless of distance from the near-field-light-generating surface 20a, and is equal to the maximum width of the first end face portion 41a.

As shown in FIG. 2, the edge E of the first end face portion 41a has a first end point EP1 and a second end point EP2 opposite to each other in the track width direction (the X direction). The second end face portion 42a has a first side end SE1 and a second side end SE2 opposite to each other in the track width direction. Both the first and second side ends SE1 and SE2 extend along the direction of travel of the recording medium 90 (the Z direction). The distance between the first side end SE1 and the second side end SE2 is greater than the length of the edge E.

The second end face portion 42a is in precise alignment with the first end face portion 41a as described below. As shown in FIG. 2, we assume a first imaginary straight line L1 passing through the first end point EP1 and being parallel to the direction of travel of the recording medium 90, and a second imaginary straight line L2 passing through the second end point EP2 and being parallel to the direction of travel of the recording medium 90. The distance between the first imaginary straight line L1 and the first side end SE1 is equal to the distance between the second imaginary straight line L2 and the second side end SE2.

The width of the third end face portion 43a in the track width direction is equal to the width of the second end face portion 42a at the boundary between the second end face portion 42a and the third end face portion 43a, and increases with increasing distance from the near-field-light-generating surface 20a. The maximum width of the third end face portion 43a in the track width direction is greater than the distance between the first side end SE1 and the second side end SE2. The fourth end face portion 44a is greater than the third end face portion 43a in width in the track width direction.

As shown in FIGS. 1 and 2, the main pole 40 includes the tip portion 41 including the first end face portion 41a, the middle portion 42 including the second end face portion 42a, and the wide portion 43 including the third end face portion 43a. As shown in FIG. 5, the width of the wide portion 43 in the track width direction (the X direction) gradually increases with increasing distance from the medium-facing surface 80, and then becomes constant. Although not illustrated, the widths of the tip portion 41 and the middle portion 42 also gradually increase with increasing distance from the medium-facing surface 80, and then become constant.

As shown in FIGS. 1 and 3, the main pole 40 further includes the extended portion 44 including the fourth end face portion 44a. As shown in FIG. 5, the width of the extended portion 44 in the track width direction gradually increases with increasing distance from the medium-facing surface 80, and then becomes constant.

Relative locations of the plasmon generator 20, the gap film 22, the surrounding layer 30 and the main pole 40 with respect to each other in the medium-facing surface 80 will now be described with reference to FIG. 1 and FIG. 2. As shown in FIG. 1 and FIG. 2, the first side portion 30A of the surrounding layer 30 has a first surrounding layer end face 30Aa located in the medium-facing surface 80. The second side portion 30B of the surrounding layer 30 has a second surrounding layer end face 30Ba located in the medium-facing surface 80. Since the first and second side portions 30A and 30B are portions of the surrounding layer 30, the surrounding layer 30 can be said to have the first and second surrounding layer end faces 30Aa and 30Ba. The first surrounding layer end face 30Aa and the second surrounding layer end face 30Ba are located on opposite sides of the first and second end face portions 41a and 42a in the track width direction (the X direction) so that the first and second end face portions 41a and 42a are interposed between the first and second surrounding layer end faces 30Aa and 30Ba.

The first layer 31A, the second layer 32A, the third layer 33A and the fourth layer 34A of the first side portion 30A have their respective end faces located in the medium-facing surface 80. The first surrounding layer end face 30Aa is composed of the respective end faces of the first layer 31A, the second layer 32A, the third layer 33A and the fourth layer 34A. The first layer 31B, the second layer 32B, the third layer 33B and the fourth layer 34B of the second side portion 30B have their respective end faces located in the medium-facing surface 80. The second surrounding layer end face 30Ba is composed of the respective end faces of the first layer 31B, the second layer 32B, the third layer 33B and the fourth layer 34B.

As shown in FIGS. 1 and 2, the first portion 22A of the gap film 22 has a first gap film end face 22Aa located in the medium-facing surface 80. The second portion 22B of the gap film 22 has a second gap film end face 22Ba located in the medium-facing surface 80. Since the first and second portions 22A and 22B are portions of the gap film 22, the gap film 22 can be said to have the first and second gap film end faces 22Aa and 22Ba. The first gap film end face 22Aa and the second gap film end face 22Ba are located on opposite sides of at least part of the near-field-light-generating surface 20a in the track width direction (the X direction) so that the at least part of the near-field-light-generating surface 20a is interposed between the first and second gap film end faces 22Aa and 22Ba.

The first gap film end face 22Aa has a top end EA located at its front-side end in the direction of travel of the recording medium 90 (the Z direction). The top end EA lies between the first surrounding layer end face 30Aa and the first end face portion 41a, and is located on the rear side in the direction of travel of the recording medium 90 relative to the boundary between the first end face portion 41a and the second end face portion 42a. Thus, the first gap film end face 22Aa includes a portion interposed between the first surrounding layer end face 30Aa and the first end face portion 41a, and includes no portion interposed between the first surrounding layer end face 30Aa and the second end face portion 42a.

The second gap film end face 22Ba has a top end EB located at its front-side end in the direction of travel of the recording medium 90 (the Z direction). The top end EB lies between the second surrounding layer end face 30Ba and the first end face portion 41a, and is located on the rear side in the direction of travel of the recording medium 90 relative to the boundary between the first end face portion 41a and the second end face portion 42a. Thus, the second gap film end face 22Ba includes a portion interposed between the second surrounding layer end face 30Ba and the first end face portion 41a, and includes no portion interposed between the second surrounding layer end face 30Ba and the second end face portion 42a.

As shown in FIG. 1, at least part of the third end face portion 43a is interposed between the first surrounding layer end face 30Aa and the second surrounding layer end face 30Ba. The fourth end face portion 44a is located on the front side in the direction of travel of the recording medium 90 relative to the first and second surrounding layer end faces 30Aa and 30Ba. Thus, the fourth end face portion 44a includes no portion interposed between the first surrounding layer end face 30Aa and the second surrounding layer end face 30Ba.

Now, the principle of generation of near-field light in the present embodiment and the principle of thermally-assisted magnetic recording using near-field light will be described in detail. Laser light emitted from a laser diode (not illustrated) enters the core 16. As shown in FIG. 6, the laser light 60 propagates through the core 16 toward the medium-facing surface 80, and reaches the vicinity of the plasmon generator 20. The evanescent-light-generating surface 16b1 of the top surface 16b of the core 16 generates evanescent light from the laser light 70 propagating through the core 16. More specifically, the laser light 70 is totally reflected at the evanescent-light-generating surface 16b1, and this causes the evanescent-light-generating surface 16b1 to generate evanescent light that permeates into the cladding layer 18. In the plasmon generator 20, surface plasmons are excited on the plasmon-exciting section 20b through coupling with the aforementioned evanescent light. The surface plasmons propagate to the near-field-light-generating surface 20a, and the near-field-light-generating surface 20a generates near-field light from the surface plasmons.

The near-field light generated from the near-field-light-generating surface 20a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 40 for data writing.

The specific functions and effects of the thermally-assisted magnetic recording head according to the present embodiment will now be described. In the present embodiment, the front end face 40a of the main pole 40 includes the first end face portion 41a, the second end face portion 42a, and the third end face portion 43a. The main pole 40 includes the tip portion 41 including the first end face portion 41a, the middle portion 42 including the second end face portion 42a, and the wide portion 43 including the third end face portion 43a. The first end face portion 41a has the edge E closest to the near-field-light-generating surface 20a. The second end face portion 42a has the first side end SE1 and the second side end SE2 opposite to each other in the track width direction. The distance between the first side end SE1 and the second side end SE2 is greater than the length of the edge E. The maximum width of the third end face portion 43a in the track width direction is greater than the distance between the first side end SE1 and the second side end SE2.

In the present embodiment, track width is defined by the length of the edge E of the first end face portion 41a. Now, let us consider a thermally-assisted magnetic recording head of a comparative example without the second end face portion 42a. In this comparative example, when the first end face portion 41a is small in height (dimension in the Z direction), track width may become large due to magnetic flux produced from the third end face portion 43a. In this case, if the third end face portion 43a is not in precise alignment with the first end face portion 41a, the distribution of strength of the write magnetic field may deviate from a desired distribution due to the magnetic flux produced from the third end face portion 43a. On the other hand, if the first end face portion 41a is large in height, the tip portion 41 elongates and narrows, and thus becomes prone to flux saturation. As a result, the main pole 40 becomes unable to pass a large amount of magnetic flux, and thus becomes unable to produce a write magnetic field of sufficient magnitude from its front end face 40a.

In the present embodiment, in contrast, the second end face portion 42a is interposed between the first end face portion 41a and the third end face portion 43a. This makes it possible to prevent the track width from becoming large due to magnetic flux produced from the third end face portion 43a. Further, as described previously, the second end face portion 42a is in precise alignment with the first end face portion 41a. This makes it possible to prevent the distribution of strength of the write magnetic field from deviating from a desired distribution. Further, the distance between the first side end SE1 and the second side end SE2 in the second end face portion 42a is greater than the length of the edge E of the first end face portion 41a. Thus, given the same distance from the edge E to the third end face portion 43a, the total volume of the tip portion 41 and the middle portion 42 is greater than the volume of the tip portion 41 of the comparative example. This makes it possible to prevent saturation of magnetic flux in the tip portion 41 and the middle portion 42. The present embodiment thus enables the main pole 40 to produce a write magnetic field of sufficient magnitude from the front end face 40a.

In the present embodiment, the front end face 40a of the main pole 40 further includes the fourth end face portion 44a which is greater than the third end face portion 43a in width in the track width direction. This configuration also enables the main pole 40 to produce a write magnetic field of sufficient magnitude from the front end face 40a.

Further, in the present embodiment, the surrounding layer 30 has the first and second surrounding layer end faces 30Aa and 30Ba located in the medium-facing surface 80. The first and second surrounding layer end faces 30Aa and 30Ba are located on opposite sides of the first and second end face portions 41a and 42a in the track width direction so that the first and second end face portions 41a and 42a are interposed between the first and second surrounding layer end faces 30Aa and 30Ba. The gap film 22 has the first and second gap film end faces 22Aa and 22Ba located in the medium-facing surface 80. The first and second gap film end faces 22Aa and 22Ba are located on opposite sides of at least part of the near-field-light-generating surface 20a in the track width direction so that the at least part of the near-field-light-generating surface 20a is interposed between the first and second gap film end faces 22Aa and 22Ba. The present embodiment enables precise alignment of the first and second surrounding layer end faces 30Aa and 30Ba with the near-field-light-generating surface 20a by adjusting the width of the first and second gap film end faces 22Aa and 22Ba located on opposite sides of at least part of the near-field-light-generating surface 20a in the track width direction. The present embodiment thereby enables precise alignment of the near-field-light-generating surface 20a and the first and second end face portions 41a and 42a with each other.

In the present embodiment, the first gap film end face 22Aa includes a portion interposed between the first surrounding layer end face 30Aa and the first end face portion 41a, and includes no portion interposed between the first surrounding layer end face 30Aa and the second end face portion 42a. The second gap film end face 22Ba includes a portion interposed between the second surrounding layer end face 30Ba and the first end face portion 41a, and includes no portion interposed between the second surrounding layer end face 30Ba and the second end face portion 42a. In the present embodiment, the distance between the first end point EP1 of the edge E and the first surrounding layer end face 30Aa and the distance between the second end point EP2 of the edge E and the second surrounding layer end face 30Ba are adjustable by adjusting the width of the first gap film end face 22Aa located between the first surrounding layer end face 30Aa and the first end face portion 41a and the width of the second gap film end face 22Ba located between the second surrounding layer end face 30Ba and the first end face portion 41a. This enables the edge E to be set at its desired length without limitations imposed by the width of the near-field-light-generating surface 20a.

In the present embodiment, a portion of the separating film 36 is interposed between the main pole 40 and the surrounding layer 30. Thus, according to the present embodiment, the distance between the first end point EP1 of the edge E and the first surrounding layer end face 30Aa and the distance between the second end point EP2 of the edge E and the second surrounding layer end face 30Ba are adjustable also by the thickness of the separating film 36.

By virtue of foregoing, the present embodiment enables precise alignment of the near-field-light-generating surface 20a and the first end face portion 41a with each other, enables a reduction in track width, and enables production of a write magnetic field of sufficient magnitude from the front end face 40a of the main pole 40.

A manufacturing method for the thermally-assisted magnetic recording head according to the present embodiment will now be described. The manufacturing method for the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality of pre-head portions arranged in rows, the plurality of pre-head portions becoming individual thermally-assisted magnetic recording heads later; and cutting the substructure to separate the plurality of pre-head portions from each other and forming the medium-facing surface 80 for each of the plurality of pre-head portions (this step will be referred to as the step of forming the medium-facing surface 80). A plurality of thermally-assisted magnetic recording heads are produced in this manner.

The manufacturing method for the thermally-assisted magnetic recording head according to the present embodiment will be described in more detail below with attention focused on a single thermally-assisted magnetic recording head. The manufacturing method for the thermally-assisted magnetic recording head starts with forming the insulating layer 2, the bottom shield layer 3, and the bottom shield gap film 4 in this order on the substrate 1. Then, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a non-illustrated insulating layer is formed to cover the return pole layer 11. The non-illustrated insulating layer is then polished by, for example, chemical mechanical polishing (hereinafter referred to as CMP), until the return pole layer 11 is exposed. Next, the shield 12 and the first layers of the coupling sections 13A and 13B are formed on the return pole layer 11. Then, the insulating layer 14 is formed over the entire top surface of the stack. The insulating layer 14 is then polished by, for example, CMP, until the shield 12 and the first layers of the coupling sections 13A and 13B are exposed.

Next, the cladding layer 15 is formed over the entire top surface of the stack. The cladding layer 15 is then selectively etched to form therein two openings for exposing the top surfaces of the first layers of the coupling sections 13A and 13B. Then, the second layers of the coupling sections 13A and 13B are formed on the first layers of the coupling sections 13A and 13B, respectively. An initial core 16P is then formed on the cladding layer 15. The cladding layer 17 is then formed over the entire top surface of the stack. The cladding layer 17 is then polished by, for example, CMP, until the initial core 16P and the second layers of the coupling sections 13A and 13B are exposed. Then, the cladding layer 18 is formed over the entire top surface of the stack.

Reference is now made to FIG. 8 to FIG. 16 to describe steps to be performed after the formation of the cladding layer 18 up to the formation of the main pole 40. FIG. 8 to FIG. 16 each show a stack of layers formed in the process of manufacturing the thermally-assisted magnetic recording head. FIG. 8 to FIG. 16 are cross-sectional views of the stack taken at the location at which the medium-facing surface 80 is to be formed. FIG. 8 to FIG. 16 omit the illustration of portions located below the initial core 16P or the core 16.

Figure 8:
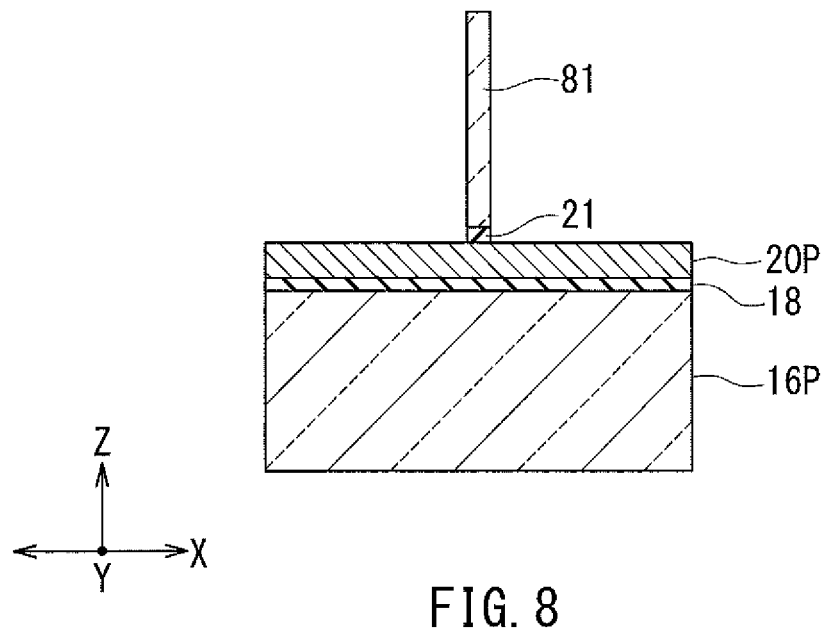
FIG. 8 is a cross-sectional view showing a step of a manufacturing method for the thermally-assisted magnetic recording head according to the first embodiment of the invention.

FIG. 8 shows a step that follows the formation of the cladding layer 18. In this step, first, an initial plasmon generator 20P is formed on the cladding layer 18. Then, the insulating film 21 is formed selectively on a portion of the top surface of the initial plasmon generator 20P, the portion being at and around the location ABS at which the medium-facing surface 80 is to be formed. The insulating film 21 may be formed by a lift-off process. Alternatively, an initial insulating film may be first formed over the entire top surface of the initial plasmon generator 20P and then the initial insulating film may be patterned into the insulating film 21 by ion beam etching (hereinafter referred to as IBE), for example.

Next, an etching mask 81 for use to pattern the initial plasmon generator 20P is formed on the initial plasmon generator 20P and the insulating film 21. The planar shape (the shape as viewed from above) of the etching mask 81 corresponds to that of the plasmon generator 20. The etching mask 81 is formed of carbon, for example.

Figure 9:
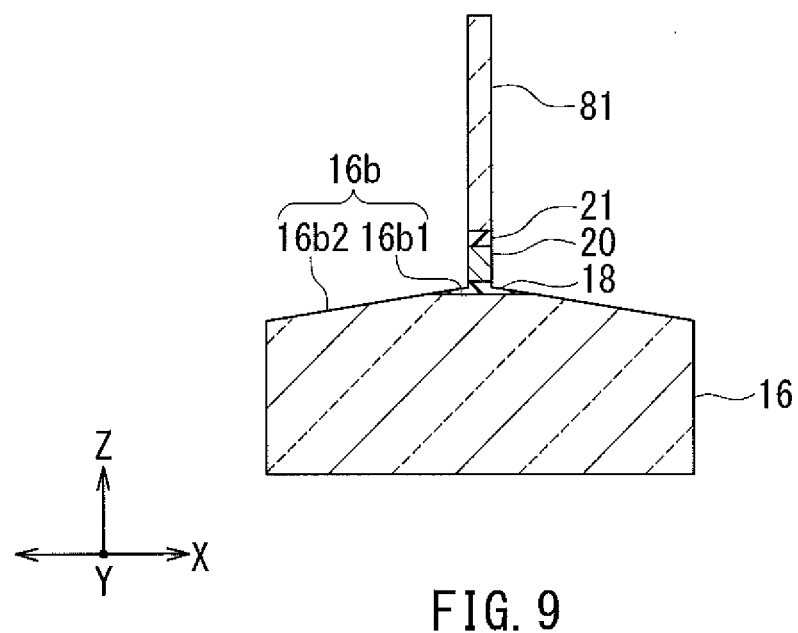
FIG. 9 is a cross-sectional view showing a step that follows the step shown in FIG. 8.

FIG. 9 shows the next step. In this step, the initial plasmon generator 20P is etched by, for example, IBE, using the etching mask 81. This makes the initial plasmon generator 20P into the plasmon generator 20. Subsequently, the core 16 and the cladding layers 17 and 18 are etched by using the plasmon generator 20 as an etching mask. This etching forms the evanescent lint generating surface 16b1 and the surrounding portion 16b2 in the top surface of the initial core 16P. This makes the initial core 16P into the core 16.

Figure 10:
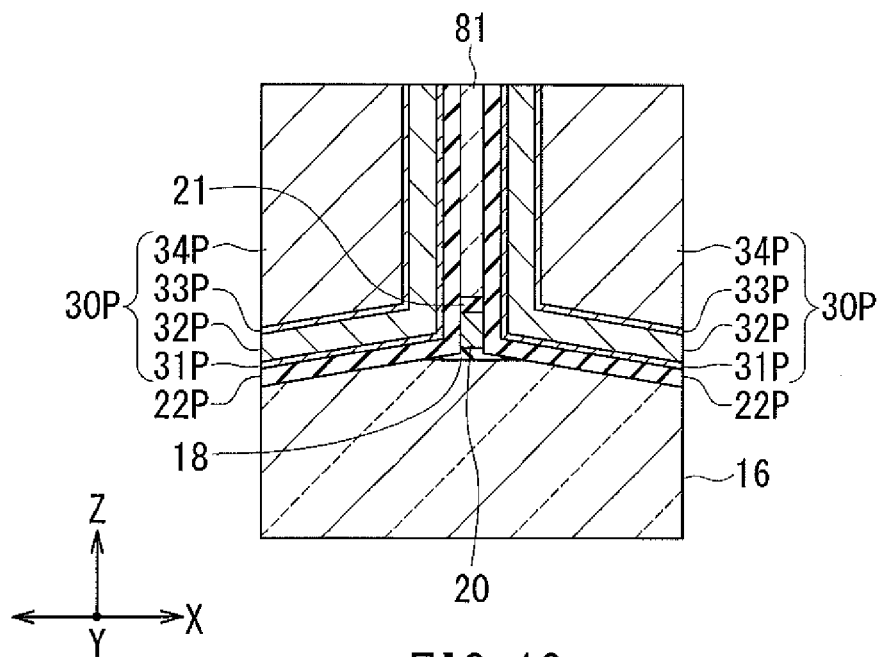
FIG. 10 is a cross-sectional view showing a step that follows the step shown in FIG. 9.

FIG. 10 shows the next step. In this step, first, an initial gap film 22P is formed over the entire top surface of the stack by atomic layer deposition, for example. The initial gap film 22P is formed to cover the plasmon generator 20 and the etching mask 81. Then, an initial surrounding layer 30P is formed on the initial gap film 22P. The initial surrounding layer 30P includes an initial first layer 31P, an initial second layer 32P, an initial third layer 33P and an initial fourth layer 34P stacked in this order on the initial gap film 22P. The initial surrounding layer 30P is formed to cover a portion of the initial gap film 22P located at and around the location ABS at which the medium-facing surface 80 is to be formed. Then, the first heat sink 24 (see FIG. 3) is formed over the initial gap film 22P and the initial surrounding layer 30P. The initial gap film 22P, the initial surrounding layer 30P and the first heat sink 24 are then polished by, for example, CMP, until the etching mask 81 is exposed.

Figure 11:
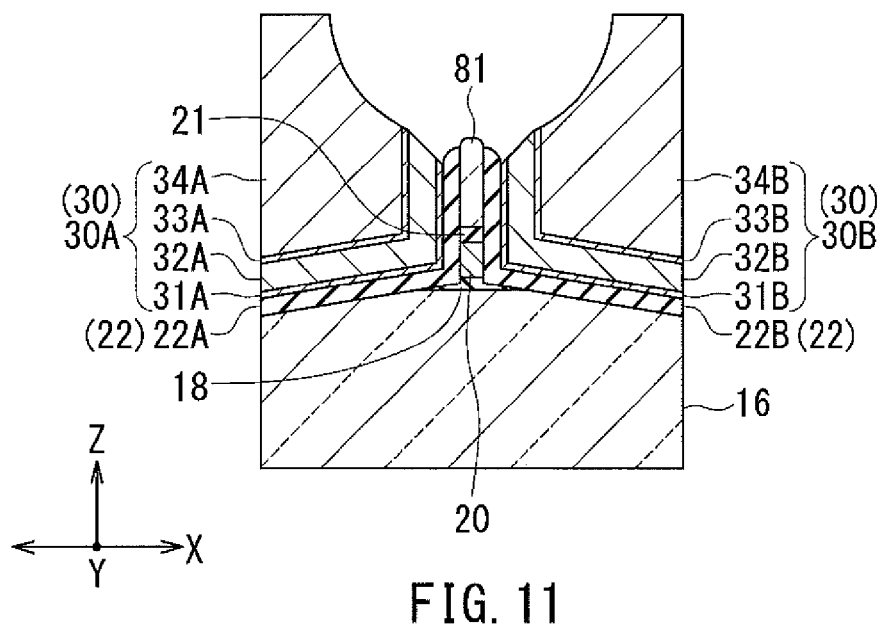
FIG. 11 is a cross-sectional view showing a step that follows the step shown in FIG. 10.

FIG. 11 shows the next step. In this step, a photoresist mask (not illustrated) is formed on the initial surrounding layer 30P and the first heat sink 24. This photoresist mask is formed by patterning a photoresist layer by photolithography. Other photoresist masks to be used in later steps will be formed in the same manner as this one. The photoresist mask has an opening shaped to correspond to the planar shape of the plasmon generator 20. The opening is larger in planar shape than the plasmon generator 20. Then, in this step, part of each of the initial gap film 22P, the initial surrounding layer 30P and the first heat sink 24 and at least part of the etching mask 81 are etched by, for example, IBE, using the photoresist mask as an etching mask. This etching makes the initial surrounding layer 30P into the surrounding layer 30. This etching also makes the initial first layer 31P into the first layers 31A and 31B, the initial second layer 32P into the second layers 32A and 32B, the initial third layer 33P into the third layers 33A and 33B, and the initial fourth layer 34P into the fourth layers 34A and 34B. In the present embodiment, the etching mask 81 is etched in part so that a portion of the etching mask 81 remains on the plasmon generator 20 and the insulating film 21. This prevents the top surface 20c of the plasmon generator 20 from being damaged by etching.

Figure 12:
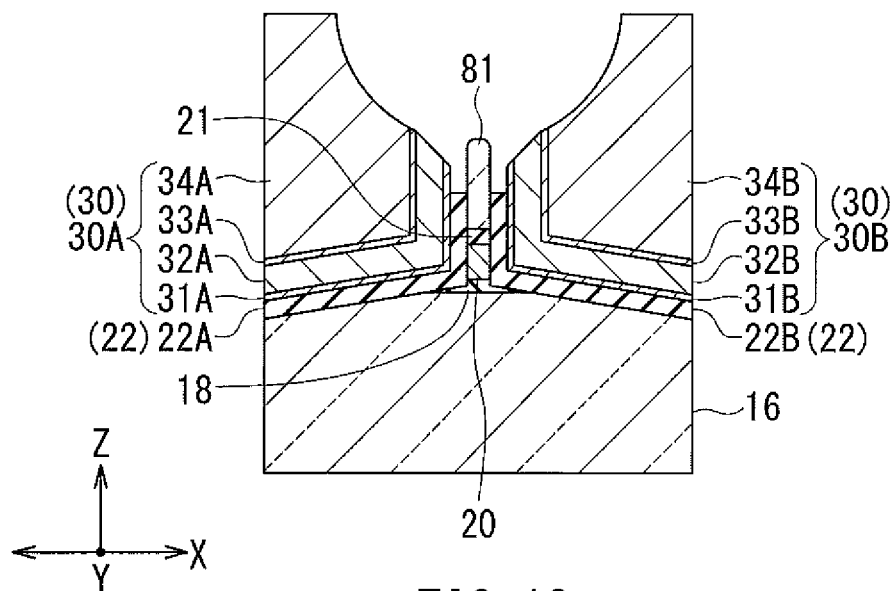
FIG. 12 is a cross-sectional view showing a step that follows the step shown in FIG. 11.

FIG. 12 shows the next step. In this step, the initial gap film 22P is partially removed by performing etching until the top end of the initial gap film 22P reaches near the level of the top ends EA and EP (see FIG. 14) to be formed later. The etching of the initial gap film 22P is effected by, for example, wet etching using an alkaline developing solution.

Figure 13:
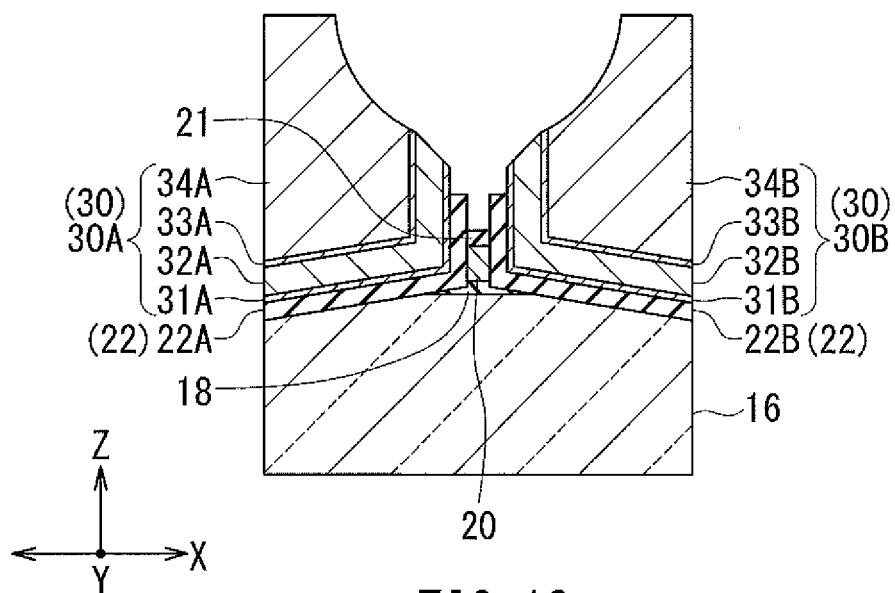
FIG. 13 is a cross-sectional view showing a step that follows the step shown in FIG. 12.

FIG. 13 shows the next step. In this step, the remainder of the etching mask 81 remaining after the step of FIG. 12, and the non-illustrated photoresist mask are removed. Where the etching mask 81 is formed of carbon, removal of the etching mask 81 is effected by ashing, for example.

FIG. 13 shows the next step. In this step, the initial gap film 22P is partially removed by etching so as to make the initial gap film 22P into the gap film 22. The etching of the initial gap film 22P is effected by, for example, wet etching using an alkaline developing solution.

Figure 14:
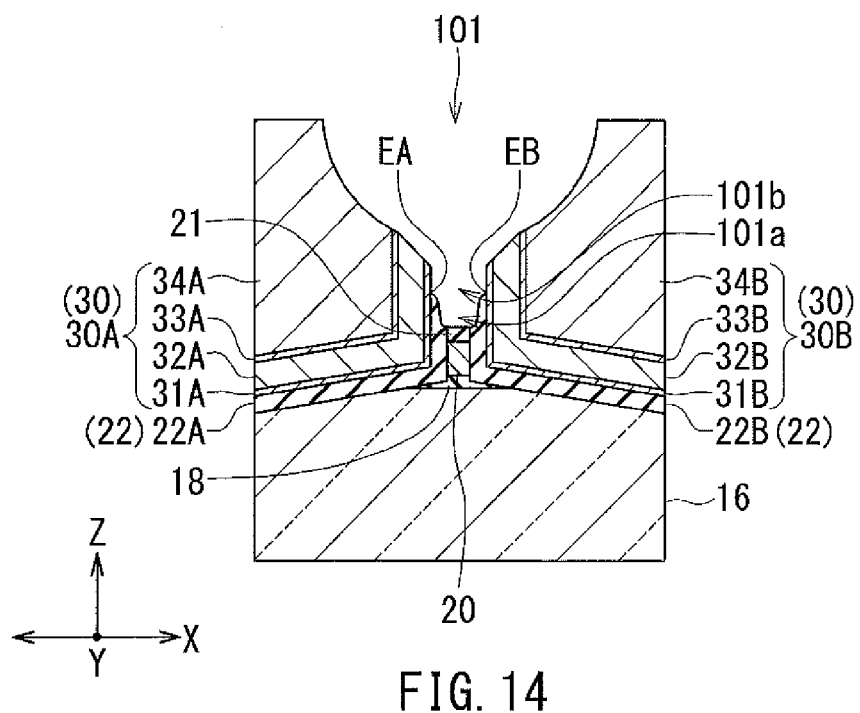
FIG. 14 is a cross-sectional view showing a step that follows the step shown in FIG. 13.

A series of steps from the step shown in FIG. 11 to the step shown in FIG. 14 corresponds to the removal step of the present invention. As shown in FIG. 14, the removal step results in the formation of a structure having a recess 101, the structure including the plasmon generator 20, the surrounding layer 30 and the gap film 22. The recess 101 includes a first space 101a for receiving at least part of the tip portion 41 and a second space 101b for receiving at least part of the middle portion 42.

Figure 15:
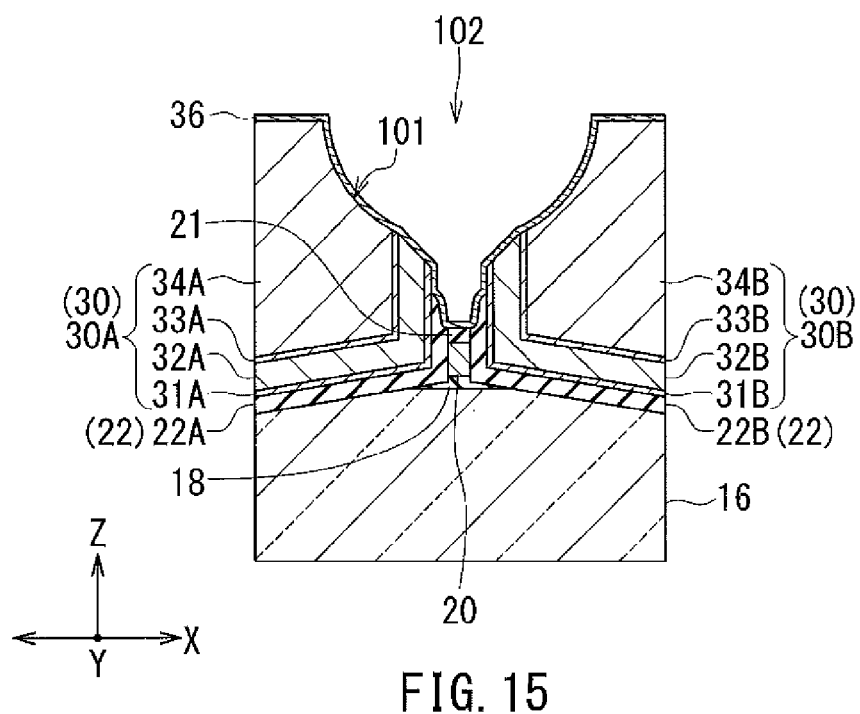
FIG. 15 is a cross-sectional view showing a step that follows the step shown in FIG. 14.

FIG. 15 shows the next step. In this step, first, the second heat sink 25 (see FIG. 3) is formed on the plasmon generator 20, the surrounding layer 30 and the first heat sink 24. Then, the separating film 36 is formed on the aforementioned structure by atomic layer deposition, for example. The separating film 36 forms a receiving section 102 shaped to correspond to the recess 101.

Figure 16:
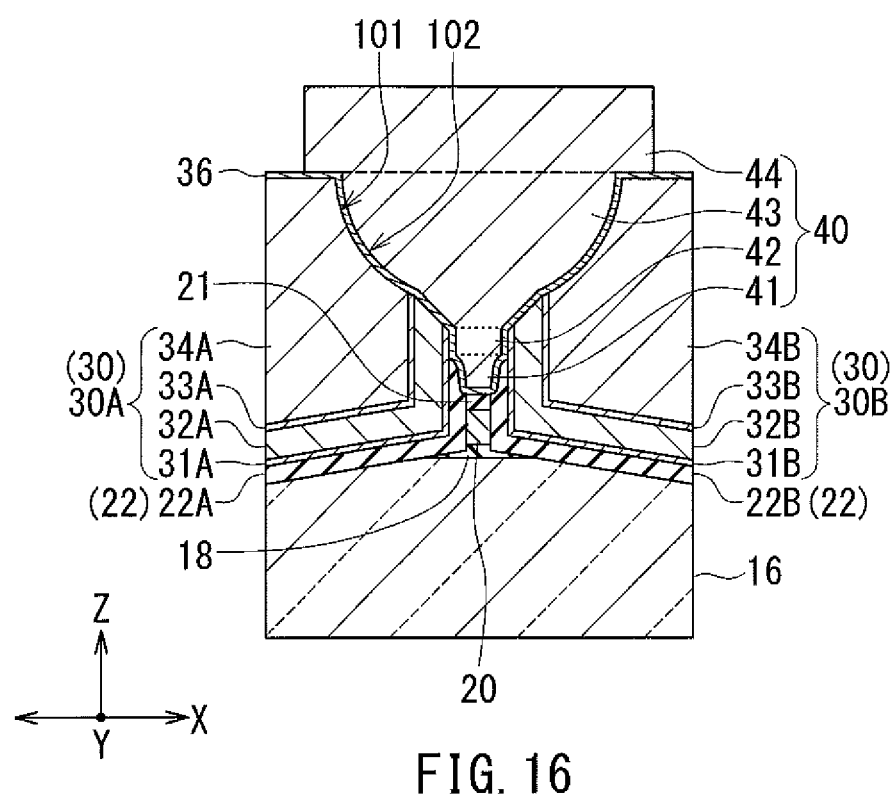
FIG. 16 is a cross-sectional view showing a step that follows the step shown in FIG. 15.

FIG. 16 shows the next step. In this step, first, a seed layer (not illustrated) is formed on the separating film 36. Then, the main pole 40 is formed by plating, using the seed layer as an electrode and a seed. In the present embodiment, the main pole 40 is formed on the separating film 36 such that the entirety of the tip portion 41 and at least part of the middle portion 42 are received in the receiving section 102. As a result, at least part of the tip portion 41 is received in the first space 101*a* (see FIG. 14) of the recess 101, and at least part of the middle portion 42 is received in the second space 101*b* (see FIG. 14) of the recess 101. Then, a portion of the seed layer that is not covered with the main pole 40 is removed by, for example, IBE, using the main pole 40 as an etching mask.

Now, steps to follow the step shown in FIG. 16 will be described with reference to FIG. 6 and FIG. 7. First, the nonmagnetic metal film 37 is formed to cover the main pole 40 and the separating film 36 by sputtering, for example. Then, the third heat sink 38 is formed on the nonmagnetic metal film 37 by frame plating or lift-off process, for example. The gap film 22 is then selectively etched to form therein two openings for exposing the top surfaces of the second layers of the coupling sections 13A and 13B. Next, the third layers of the coupling sections 13A and 13B are formed on the second layers of the coupling sections 13A and 13B, respectively. Then, the dielectric layer 45 is formed over the entire top surface of the stack. The main pole 40, the third layers of the coupling sections 13A and 13B, the third heat sink 38, the nonmagnetic metal film 37 and the dielectric layer 45 are then polished by CMP, for example.

Next, a non-illustrated nonmagnetic metal film is formed on the third heat sink 38. Then, the coupling layer 46 is formed over the main pole 40, the dielectric layer 45 and the non-illustrated nonmagnetic metal film, and the coupling layer 47 is formed over the third layers of the coupling sections 13A and 13B and the dielectric layer 45. Next, the dielectric layer 48 is formed over the entire top surface of the stack. The dielectric layer 48 is then polished by, for example, CMP, until the coupling layer 46 and the coupling layer 47 are exposed.

Next, the coupling layer 53 is formed on the coupling layer 46, and the coupling layer 54 is formed on the coupling layer 47. The insulating film 55 is then formed over the entire top surface of the stack. The first layer 51 of the coil 50 is then formed on the insulating film 55. Next, the insulating layer 56 is formed over the entire top surface of the stack. The insulating film 55 and the insulating layer 56 are then polished by, for example, CMP, until the coupling layers 53 and 54 and the first layer 51 are exposed.

Next, the insulating layer 57 is formed on the first layer 51 of the coil 50 and the insulating layer 56. Then, the coupling layer 58 is formed on the coupling layer 53, and the coupling layer 59 is formed on the coupling layer 54. Next, the insulating film 60 is formed over the entire top surface of the stack. The insulating layer 57 and the insulating film 60 are then selectively etched to form therein openings for exposing a portion of the first layer 51. Then, the second layer 52 of the coil 50 is formed on the insulating film 60 and the aforementioned portion of the first layer 51. Next, the insulating layer 61 is formed over the entire top surface of the stack. The insulating film 60 and the insulating layer 61 are then polished by, for example, CMP, until the coupling layers 58 and 59 and the second layer 52 are exposed.

Next, the insulating layer 62 is formed on the second layer 52 of the coil 50 and the insulating layer 61. The yoke layer 63 is then formed over the coupling layers 58 and 59 and the insulating layer 62. Next, the insulating layer 64 is formed over the entire top surface of the stack. The insulating layer 64 is then polished by, for example, CMP, until the yoke layer 63 is exposed. Then, the protective layer 65 is formed to cover the yoke layer 63 and the insulating layer 64. Wiring, terminals, and other components are then formed on the top surface of the protective layer 65. When the substructure is completed thus, the step of forming the medium-facing surface 80 is performed. A protective film for covering the medium-facing surface 80 may be formed thereafter. Being provided with the medium-facing surface 80, each pre-head portion becomes a thermally-assisted magnetic recording head.

The step of forming the medium-facing surface 80 includes the step of polishing the surface of each pre-head portion that has resulted from cutting the substructure, and the step of forming a rail on the polished surface for allowing the slider to fly.

The effects of the manufacturing method for the thermally-assisted magnetic recording head according to the present embodiment will now be described. In the manufacturing method for the thermally-assisted magnetic recording head according to the present embodiment, the initial gap film 22P is formed to cover the plasmon generator 20 and the etching mask 81 after the step of etching the initial plasmon generator 20P, and the surrounding layer 30 is formed after the formation of the initial gap film 22P. The surrounding layer 30 is thus formed in a self-aligned manner to be in precise alignment with the plasmon generator 20. This brings the first and second surrounding layer end faces 30Aa and 30Ba into precise alignment with the near-field-light-generating surface 20*a*.

Further, according to the present embodiment, the removal step of removing a portion of the initial gap film 22P and at least a portion of the etching mask 81 is performed after the formation of the surrounding layer 30. The removal step makes the initial gap film 22P into the gap film 22 and results in the formation of a structure having the recess 101, the structure including the plasmon generator 20, the surrounding layer 30 and the gap film 22. The location of the first space 101*a* of the recess 101 is defined by the etching mask 81. The location of the second space 101*b* of the recess 101 is defined by the etching mask 81 and the initial gap film 22P. The main pole 40 is formed such that at least part of the tip portion 41 is received in the first space 101*a* of the recess 101 and at least part of the middle portion 42 is received in the second space 101*b* of the recess 101. The tip portion 41 and the middle portion 42 are thereby formed in a self-aligned manner to be in precise alignment with the plasmon generator 20. This brings the first and second end face portions 41*a* and 42*a* into precise alignment with the near-field-light-generating surface 20*a*.

In the present embodiment, both the distance between the first imaginary straight line L1 and the first side end SE1 and the distance between the second imaginary straight line L2 and the second side end SE2 shown in FIG. 2 are defined by the thickness of the initial gap film 22P. This makes the distance between the first imaginary straight line L1 and the first side end SE1 equal to the distance between the second imaginary straight line L2 and the second side end SE2. As a result, the second end face portion 42*a* is precisely aligned with the first end face portion 41*a*.

In the present embodiment, the width of the first gap film end face 22Aa located between the first surrounding layer end face 30Aa and the first end face portion 41*a*, and the width of the second gap film end face 22Ba located between the second surrounding layer end face 30Ba and the first end face portion 41*a* are adjustable by the thickness of the initial gap film 22P and the etching process shown in FIG. 14. This enables adjustment of the distance between the first end point EP1 of the edge E and the first surrounding layer end face 30Aa and the distance between the second end point EP2 of the edge E and the second surrounding layer end face 30Ba. The present embodiment thereby enables the edge E to be set at its desired length without limitations imposed by the width of the near-field-light-generating surface 20a.

Modification Examples

Figure 17:
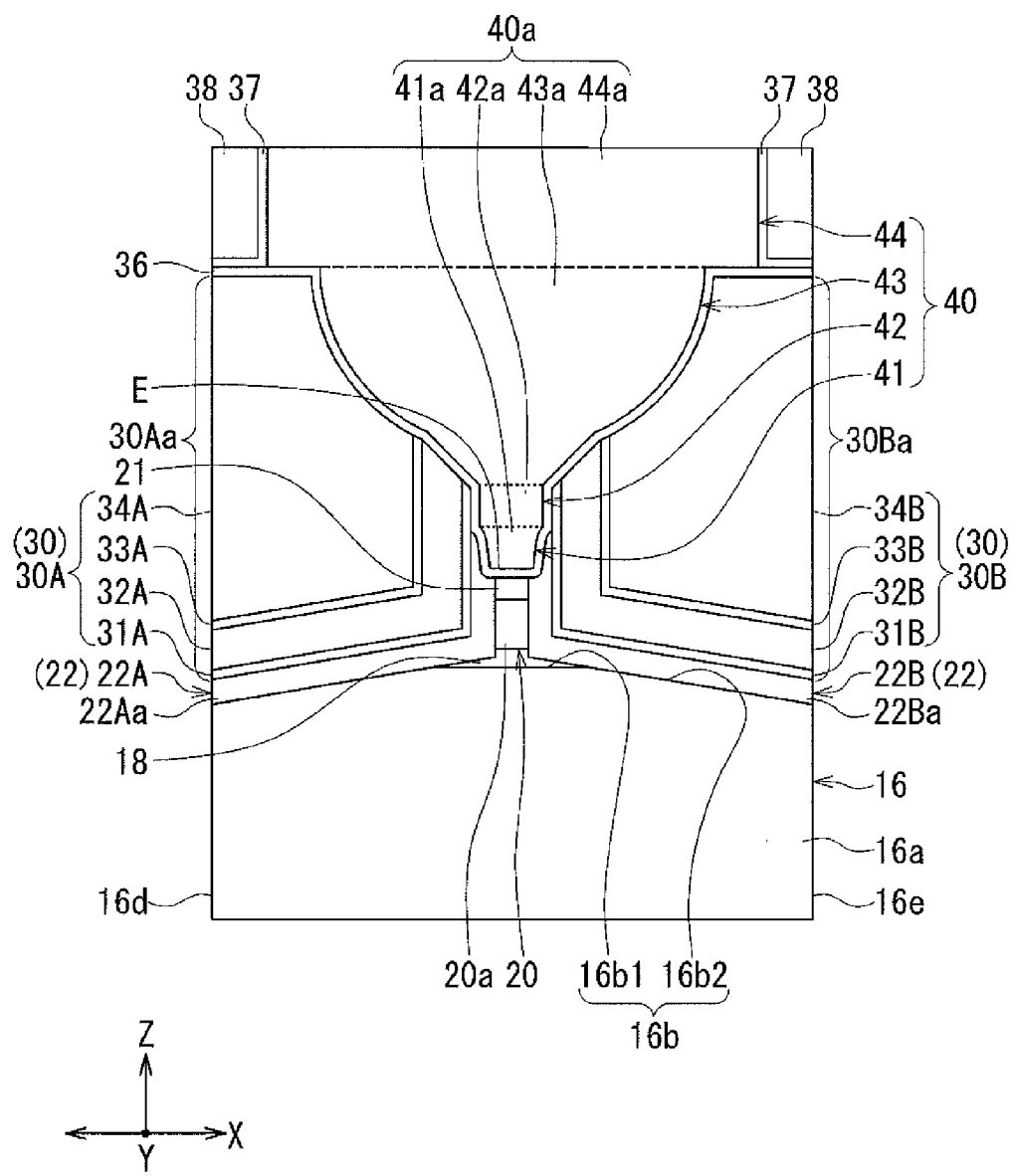
FIG. 17 is a front view showing a first modification example of the thermally-assisted magnetic recording head according to the first embodiment of the invention.

A first and a second modification example of the present embodiment will now be described with reference to FIG. 17 and FIG. 18. FIG. 17 is a front view showing the first modification example of the thermally-assisted magnetic recording head according to the present embodiment. In the first modification example, the edge E of the first end face portion 41a of the front end face 40a of the main pole 40 has a length greater than the width of the near-field-light-generating surface 20a of the plasmon generator 20 in the track width direction (the X direction). The first end face portion 41a of such a shape can be formed by etching a larger amount of the initial gap film 22P in the step shown in FIG. 14.

Figure 18:
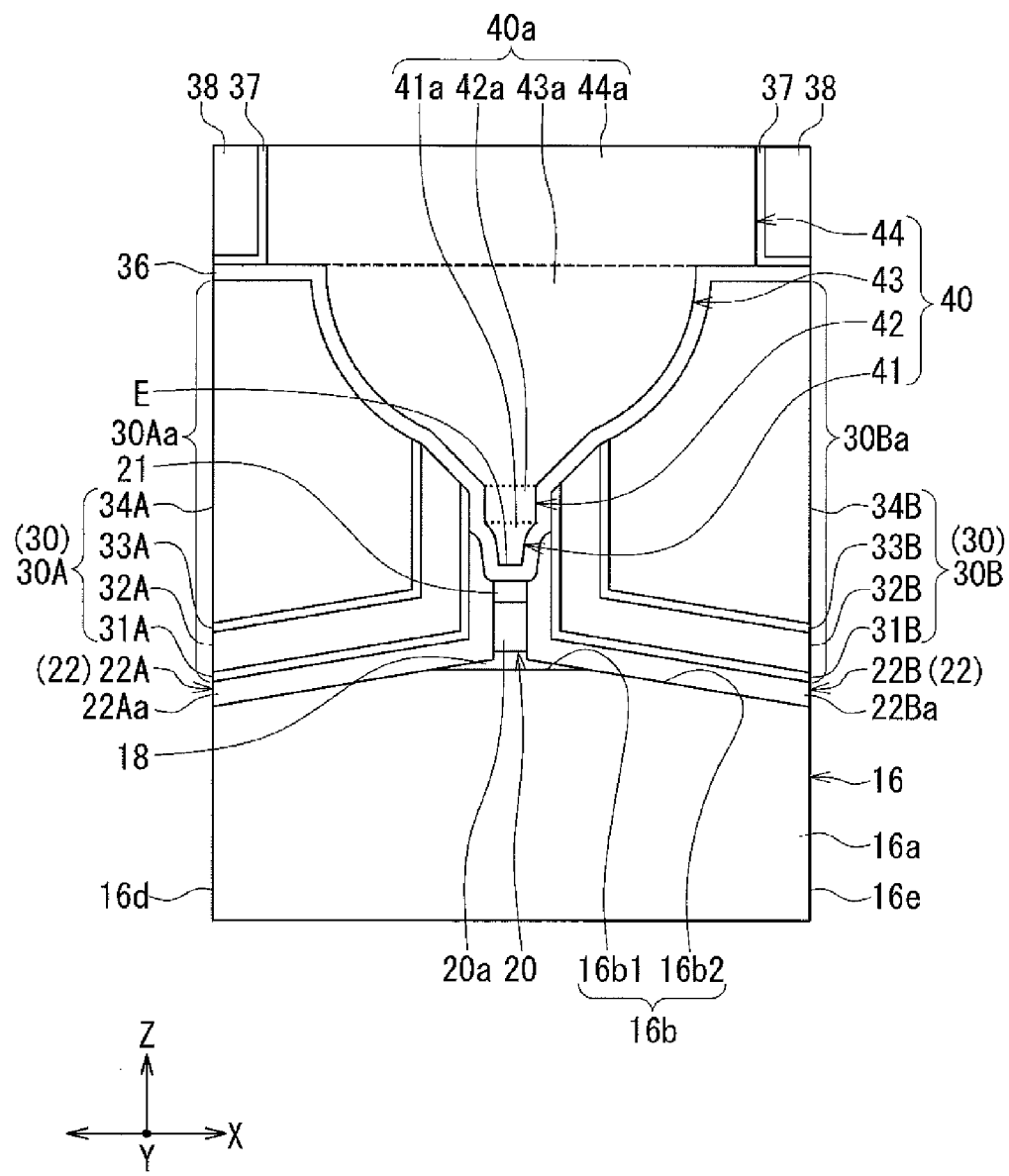
FIG. 18 is a front view showing a second modification example of the thermally-assisted magnetic recording head according to the first embodiment of the invention.

FIG. 18 is a front view showing the second modification example of the thermally-assisted magnetic recording head according to the present embodiment. In the second modification example, the edge E of the first end face portion 41a of the front end face 40a of the main pole 40 has a length smaller than the width of the near-field-light-generating surface 20a of the plasmon generator 20 in the track width direction. The first end face portion 41a of such a shape can be formed by increasing the thickness of the separating film 36, for example.

Second Embodiment

Figure 19:
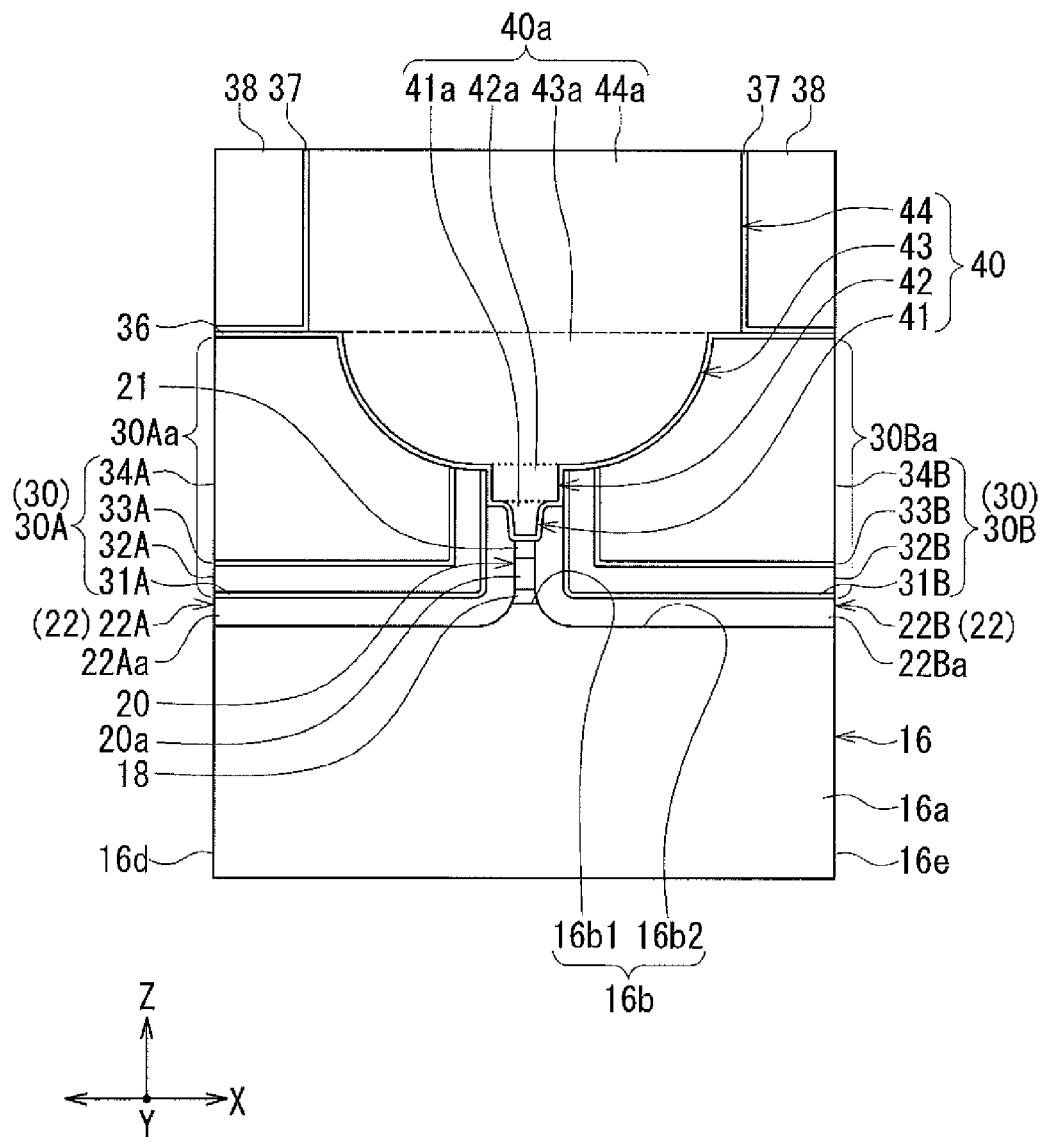
FIG. 19 is a front view showing the main part of a thermally-assisted magnetic recording head according to a second embodiment of the invention.

A thermally-assisted magnetic recording head according to a second embodiment of the invention will now be described with reference to FIG. 19. FIG. 19 is a front view showing the main part of the thermally-assisted magnetic recording head according to the present embodiment.

In the thermally-assisted magnetic recording head according to the present embodiment, the first end face portion 41a of the front end face 40a of the main pole 40 and the surrounding portion 16b2 of the top surface 16b of the core 16 are shaped differently than in the first embodiment. In the present embodiment, the width of the first end face portion 41a in the track width direction is substantially constant regardless of distance from the near-field-light-generating surface 20a. Further, in the present embodiment, most part of the surrounding portion 16b2 is parallel to the bottom surface 16c (see FIG. 6) of the core 16.

The remainder of configuration, function and effects of the present embodiment are similar to those of the first embodiment.

Third Embodiment

Figure 20:
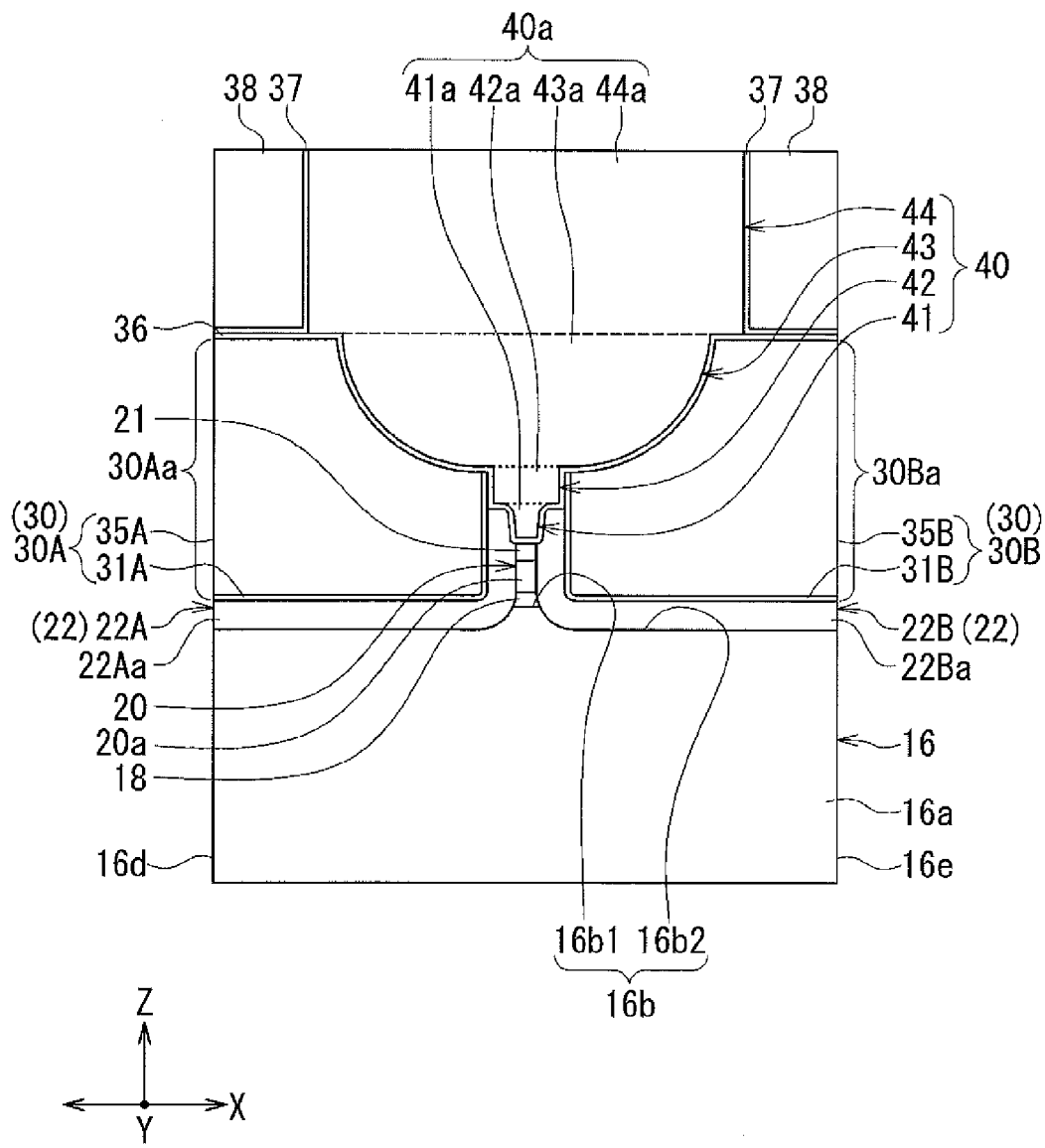
FIG. 20 is a front view showing the main part of a thermally-assisted magnetic recording head according to a third embodiment of the invention.
Figure 21:
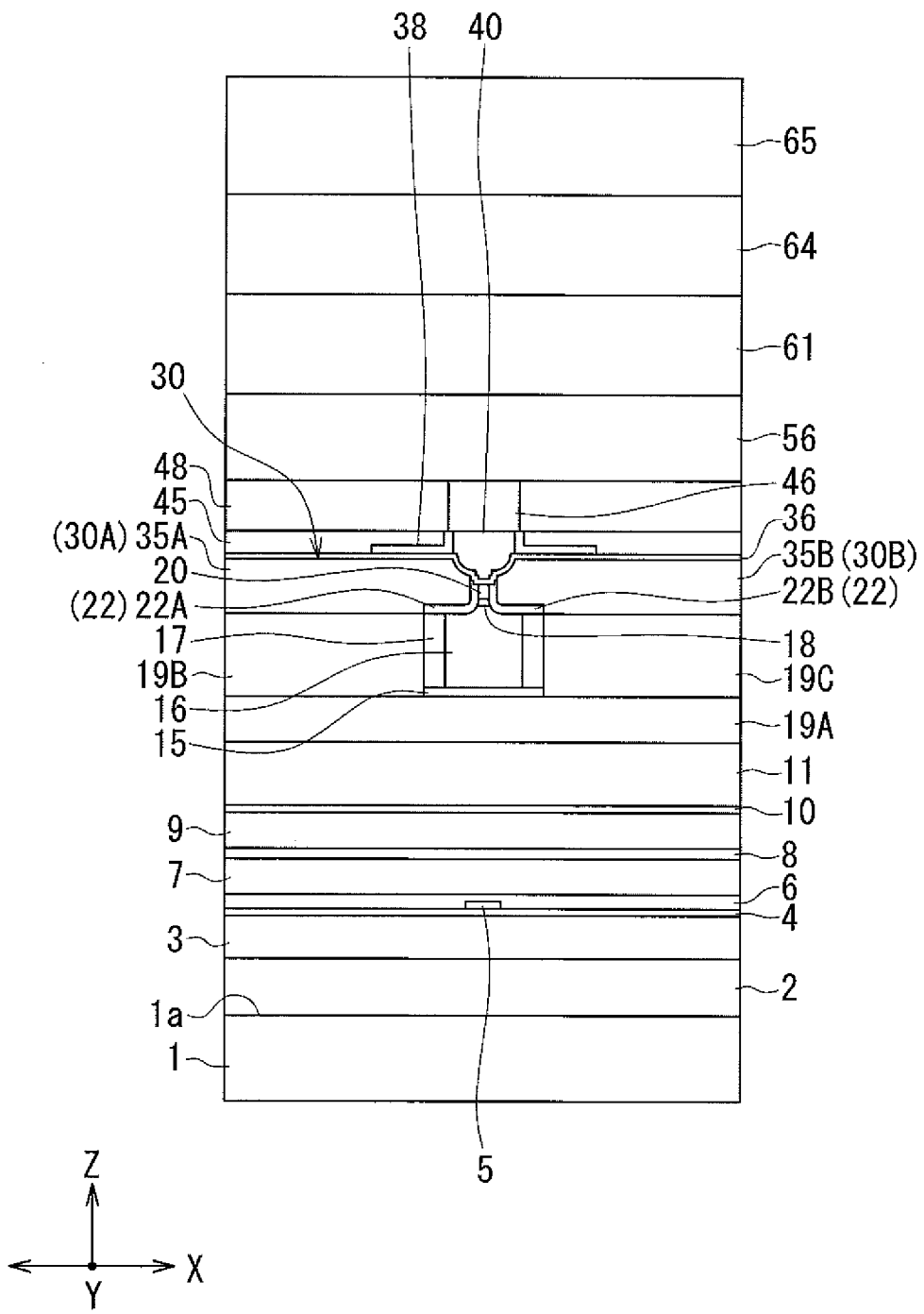
FIG. 21 is a front view showing the medium-facing surface of the thermally-assisted magnetic recording head according to the third embodiment of the invention.

A thermally-assisted magnetic recording head according to a third embodiment of the invention will now be described with reference to FIG. 20 and FIG. 21. FIG. 20 is a front view showing the main part of the thermally-assisted magnetic recording head according to the present embodiment. FIG. 21 is a front view showing the medium-facing surface of the thermally-assisted magnetic recording head according to the present embodiment.

The thermally-assisted magnetic recording head according to the present embodiment is configured differently than in the second embodiment in the following ways. In the present embodiment, the surrounding layer 30 includes a first side shield 35A and a second side shield 35B each formed of a magnetic material, in place of the second layers 32A and 32B, the third layers 33A and 33B and the fourth layers 34A and 34B of the second embodiment.

The first side shield 35A constitutes the principal part of the first side portion 30A. In the present embodiment, the first side portion 30A is constituted by the first side shield 35A and the first layer 31A. The first side shield 35A has a first side shield end face 35Aa constituting at least part of the first surrounding layer end face 30Aa. The first surrounding layer end face 30Aa of the first side portion 30A is constituted by the first side shield end face 35Aa and the end face of the first layer 31A.

The second side shield 35B constitutes the principal part of the second side portion 30B. In the present embodiment, the second side portion 30B is constituted by the second side shield 35B and the first layer 31B. The second side shield 35B has a second side shield end face 35Ba constituting at least part of the second surrounding layer end face 30Ba. The second surrounding layer end face 30Ba is constituted by the second side shield end face 35Ba and the end face of the first layer 31B.

The shield 12 of the second embodiment is not provided in the present embodiment. Instead, the return path section R of the present embodiment includes a coupling layer 19A and two coupling sections 19B and 19C. The shape and location of the coupling layer 19A are the same as those of the shield 12. As shown in FIG. 21, the two coupling sections 19B and 19c are embedded in the cladding layers 15 and 17. The coupling section 19B and the coupling section 19C are located on opposite sides of the core 16 in the track width direction (the X direction) and spaced from the core 16. Each of the two coupling sections 19B and 19C has an end face located in the medium-facing surface 80, a top surface, and a bottom surface. The bottom surface of each of the two coupling sections 19B and 19C is in contact with the coupling layer 19A.

The first layer 31A lies on the first portion 22A of the gap film 22. The first portion 22A and the first layer 31A have their respective openings for exposing the top surface of the coupling section 19B. The first side shield 35A lies on the first layer 31A and contacts the top surface of the coupling section 19B through the openings of the first portion 22A and the first layer 31A.

The first layer 31B lies on the second portion 22B of the gap film 22. The second portion 22B and the first layer 31B have their respective openings for exposing the top surface of the coupling section 19C. The second side shield 35B lies on the first layer 31B and contacts the top surface of the coupling section 19C through the openings of the second portion 22B and the first layer 31B.

The return path section R of the present embodiment connects the main pole 40 to the first and second side shields 35A and 35B. The first and second side shields 35A and 35B and the return path section R have the function of allowing a magnetic flux that has been produced from the front end face 40a of the main pole 40 and has magnetized a portion of the recording medium 90 to flow back to the main pole 40. In the present embodiment, in particular, the first and second side shields 35A and 35B are able to capture a magnetic flux that is produced from the first to third end face portions 41a to 43a of the front end face 40a of the main pole 40, and to thereby prevent such a magnetic flux from reaching the recording medium 90. As a result, it becomes possible to sharpen the distribution of strength of the write magnetic field in the track width direction. This in turn makes it possible to reduce the track width and thereby increase the track density. Further, the sharpened distribution of strength of the write magnetic field in the track width direction allows for the formation of a magnetization transition region into a shape approximating a rectilinear shape, rather than a curved shape, on the recording medium 90. It is thereby possible to achieve higher linear recording density.

If the distance between the first end face portion 41a and the first side shield end face 35Aa and the distance between the first end face portion 41a and the second side shield end face 35Ba are excessively small, there arises the problem that the write magnetic field produced from the first end face portion 31a is small in magnitude. In the present embodiment, however, the aforementioned distances are adjustable by the width of the first gap film end face 22Aa located between the first surrounding layer end face 30Aa and the first end face portion 41a and the width of the second gap film end face 22Ba located between the second surrounding layer end face 30Ba and the first end face portion 41a. The present embodiment prevents the aforementioned problem by appropriate sizing of the aforementioned distances.

The remainder of configuration, function and effects of the present embodiment are similar to those of the second embodiment.

The present invention is not limited to the foregoing embodiments, and various modifications may be made thereto. For example, as far as the requirements of the appended claims are met, the main pole 40, the plasmon generator 20, the surrounding layer 30, the gap film 22 and the separating film 36 may be shaped and located as desired, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A thermally-assisted magnetic recording head comprising:
a medium-facing surface configured to face a recording medium;
a main pole for producing a write magnetic field for use to write data on the recording medium;
a waveguide including a core and a cladding, the core allowing light to propagate therethrough, the cladding being provided around the core;
a plasmon generator having a near-field-light-generating surface located in the medium-facing surface;
a surrounding layer; and
a gap film for separating the plasmon generator from the surrounding layer, wherein
the plasmon generator is configured to excite thereon a surface plasmon resulting from the light propagating through the core, and to generate near-field light from the surface plasmon at the near-field-light-generating surface,
the main pole has a front end face located in the medium-facing surface,
the front end face includes a first end face portion, a second end face portion, and a third end face portion,
the near-field-light-generating surface, the first end face portion, the second end face portion and the third end face portion are arranged in this order along a direction of travel of the recording medium,
the main pole includes a tip portion including the first end face portion, a middle portion including the second end face portion, and a wide portion including the third end face portion,
the first end face portion has an edge closest to the near-field-light-generating surface,
the edge has a first end point and a second end point opposite to each other in a track width direction,
the second end face portion has a first side end and a second side end opposite to each other in the track width direction,
both the first side end and the second side end extend along the direction of travel of the recording medium,
a distance between the first side end and the second side end is greater than a length of the edge of the first end face portion,
a distance between the first side end and a first imaginary straight line is equal to a distance between the second side end and a second imaginary straight line, the first imaginary straight line passing through the first end point and being parallel to the direction of travel of the recording medium, the second imaginary straight line passing through the second end point and being parallel to the direction of travel of the recording medium,
a maximum width of the third end face portion in the track width direction is greater than the distance between the first side end and the second side end,
the surrounding layer has a first surrounding layer end face and a second surrounding layer end face, both located in the medium-facing surface,
the first surrounding layer end face and the second surrounding layer end face are located on opposite sides of the first and second end face portions in the track width direction so that the first and second end face portions are interposed between the first and second surrounding layer end faces,
the gap film has a first gap film end face and a second gap film end face, both located in the medium-facing surface, and
the first gap film end face and the second gap film end face are located on opposite sides of at least part of the near-field-light-generating surface in the track width direction so that the at least part of the near-field-light-generating surface is interposed between the first and second gap film end faces.

2. The thermally-assisted magnetic recording head according to claim 1, wherein
the first gap film end face includes a portion interposed between the first surrounding layer end face and the first end face portion, and includes no portion interposed between the first surrounding layer end face and the second end face portion, and
the second gap film end face includes a portion interposed between the second surrounding layer end face and the first end face portion and includes no portion interposed between the second surrounding layer end face and the second end face portion.

3. The thermally-assisted magnetic recording head according to claim 1, wherein
the front end face of the main pole further includes a fourth end face portion,
the third end face portion is interposed between the second end face portion and the fourth end face portion,
the fourth end face portion is greater than the third end face portion in width in the track width direction, at least part of the third end face portion is interposed between the first and second surrounding layer end faces, and the fourth end face portion includes no portion interposed between the first and second surrounding layer end faces.

4. The thermally-assisted magnetic recording head according to claim 1, further comprising a separating film for separating the main pole from the surrounding layer, wherein the separating film is a single continuous film, and at least part of the separating film is interposed between the main pole and the plasmon generator, between the main pole and the surrounding layer, and between the main pole and the gap film.

5. The thermally-assisted magnetic recording head according to claim 1, wherein the surrounding layer is formed of a nonmagnetic metal material.

6. The thermally-assisted magnetic recording head according to claim 1, wherein the surrounding layer includes a first side shield and a second side shield each formed of a magnetic material, the first side shield has a first side shield end face constituting at least part of the first surrounding layer end face, and the second side shield has a second side shield end face constituting at least part of the second surrounding layer end face.

7. The thermally-assisted magnetic recording head according to claim 1, wherein the core has an evanescent-light-generating surface configured to generate evanescent light from the light propagating through the core, the plasmon generator includes a plasmon-exciting section located at a predetermined distance from the evanescent-light-generating surface and facing the evanescent-light-generating surface, and the plasmon generator is configured so that a surface plasmon is excited on the plasmon-exciting section through coupling with the evanescent light generated by the evanescent-light-generating surface, the surface plasmon propagates to the near-field-light-generating surface, and the near-field-light-generating surface generates near-field light from the surface plasmon.

8. The thermally-assisted magnetic recording head according to claim 1, wherein the front end face of the main pole is located on a front side in the direction of travel of the recording medium relative to the near-field-light-generating surface.

9. A manufacturing method for the thermally-assisted magnetic recording head of claim 1, comprising the steps of:
forming the waveguide;
forming the plasmon generator;
forming the surrounding layer and the gap film after the plasmon generator is formed; and
forming the main pole after the surrounding layer and the gap film are formed;
wherein the step of forming the plasmon generator includes the steps of:
forming an initial plasmon generator;
forming an etching mask for use to pattern the initial plasmon generator; and
etching the initial plasmon generator by using the etching mask so that the initial plasmon generator becomes the plasmon generator, the step of forming the surrounding layer and the gap film includes:
the step of forming an initial gap film to cover the plasmon generator and the etching mask after the step of etching the initial plasmon generator;
the step of forming the surrounding layer after the initial gap film is formed; and
the removal step of removing a portion of the initial gap film and at least a portion of the etching mask after the surrounding layer is formed, the removal step makes the initial gap film into the gap film and results in the formation of a structure having a recess, the structure including the plasmon generator, the surrounding layer and the gap film, the recess includes a first space for receiving at least part of the tip portion and a second space for receiving at least part of the middle portion, and the main pole is formed such that the at least part of the tip portion is received in the first space and the at least part of the middle portion is received in the second space.

10. The manufacturing method according to claim 9, wherein the thermally-assisted magnetic recording head further comprises a separating film for separating the main pole from the surrounding layer, the separating film being a single continuous film, at least part of the separating film being interposed between the main pole and the plasmon generator, between the main pole and the surrounding layer, and between the main pole and the gap film, the manufacturing method further comprises the step of forming the separating film on the structure after the removal step such that the separating film forms a receiving section corresponding to the recess, and after the step of forming the separating film, the main pole is formed on the separating film such that an entirety of the tip portion and at least part of the middle portion are received in the receiving section.

11. The manufacturing method according to claim 9, wherein the removal step employs wet etching to remove the portion of the initial gap film.

12. The manufacturing method according to claim 9, wherein the step of forming the surrounding layer includes the steps of: forming an initial surrounding layer to cover the initial gap film; and polishing the initial surrounding layer until the etching mask is exposed.

13. The manufacturing method according to claim 12, wherein the step of forming the surrounding layer further includes the step of etching a portion of the initial surrounding layer after the step of polishing the initial surrounding layer.

* * * * *